(12) United States Patent
Milakovich

(10) Patent No.: US 9,483,732 B1
(45) Date of Patent: Nov. 1, 2016

(54) HIGH VALUE INFORMATION ALERT AND REPORTING SYSTEM AND METHOD

(71) Applicant: Marko Milakovich, Saint Cloud, FL (US)

(72) Inventor: Marko Milakovich, Saint Cloud, FL (US)

( * ) Notice: Subject to any disclaimer, the term of this patent is extended or adjusted under 35 U.S.C. 154(b) by 208 days.

(21) Appl. No.: 14/173,097

(22) Filed: Feb. 5, 2014

Related U.S. Application Data

(60) Provisional application No. 61/762,429, filed on Feb. 8, 2013.

(51) Int. Cl.
*G06N 5/00* (2006.01)
*G06N 5/02* (2006.01)

(52) U.S. Cl.
CPC ........................................ *G06N 5/02* (2013.01)

(58) Field of Classification Search
CPC ......................................................... G06N 7/05
See application file for complete search history.

(56) References Cited

U.S. PATENT DOCUMENTS

| | | | |
|---|---|---|---|
| 5,675,637 A | 10/1997 | Szlam | |
| 5,812,784 A | 9/1998 | Watson | |
| 5,825,869 A | 10/1998 | Brooks | |
| 5,867,799 A | 2/1999 | Lang | |
| 5,937,329 A | 8/1999 | Helmy | |
| 6,133,912 A | 10/2000 | Montero | |
| 6,157,946 A | 12/2000 | Itakura | |
| 6,212,570 B1 | 4/2001 | Hasebe | |
| 6,351,745 B1 | 2/2002 | Itakura | |
| 6,424,998 B2 | 7/2002 | Hunter | |
| 7,240,350 B1 | 7/2007 | Eberhard | |
| 7,646,854 B2 | 1/2010 | Anderson | |
| 7,650,136 B2 | 1/2010 | Schnabel | |
| 7,752,259 B2 | 7/2010 | Weiser | |
| 7,786,858 B2 | 8/2010 | Whillock | |
| 7,903,099 B2 | 3/2011 | Baluja | |
| 7,983,654 B2 | 7/2011 | Shelton | |
| RE42,690 E | 9/2011 | Aviv | |
| 8,224,284 B2 | 7/2012 | Foladare | |
| 8,265,241 B2 | 9/2012 | Rowe | |
| 8,566,023 B2 | 10/2013 | Riggins | |
| 8,949,164 B1 * | 2/2015 | Mohler | G06N 7/005 706/46 |
| 2001/0032131 A1 | 10/2001 | Mowry | |
| 2002/0026359 A1 | 2/2002 | Long | |
| 2002/0065977 A1 | 5/2002 | Kindo | |
| 2002/0099769 A1 | 7/2002 | Yasui | |

(Continued)

*Primary Examiner* — Stanley K Hill
*Assistant Examiner* — Ola Olude Afolabi
(74) *Attorney, Agent, or Firm* — Brian S. Steinberger; Law Offices of Brian S. Steinberger, P.A.

(57) ABSTRACT

High value information Alert and Reporting System (HARS) and method to integrate the public into the law enforcement process by providing information on specific wanted persons/persons-of-interest to a diverse range of information display devices specifically selected to display the information to the public. Wanted persons/persons-of-interest are profiled by behavior and acquaintances and predictive behavior algorithms are used to predict locations and venues where there is a higher likelihood the person can be found and then information on that person is provided to the public in that specific area. When the public observes the wanted person, it is reported to HARS, which in turn notifies the proper Law Enforcement Agency (LEA) for investigation and apprehension. Invention can be used for providing public service information to the public in the precise area the information is needed and can also provide commercial advertising information to selected target areas.

19 Claims, 16 Drawing Sheets

(56) References Cited

U.S. PATENT DOCUMENTS

| | | | |
|---|---|---|---|
| 2004/0225681 A1* | 11/2004 | Chaney | G06F 17/30017 |
| 2006/0282780 A1 | 12/2006 | Chaney | |
| 2006/0287913 A1 | 12/2006 | Baluja | |
| 2007/0174467 A1 | 7/2007 | Ballou | |
| 2007/0273480 A1 | 11/2007 | Burkman | |
| 2008/0052168 A1 | 2/2008 | Peters | |
| 2010/0106707 A1 | 4/2010 | Brown | |
| 2010/0312825 A1 | 12/2010 | Camp | |
| 2011/0227730 A1 | 9/2011 | Stevenson | |
| 2012/0130937 A1 | 5/2012 | Leon | |
| 2013/0332289 A1 | 12/2013 | Johnson | |

* cited by examiner

FUNCTIONAL EMBODIMENTS

HARS GLOBAL NETWORK
DOMESTIC AND FOREIGN OPERATIONS
STANDALONE AND SLAVE REMOTE OPERATIONS

COMMAND, CONTROL, AND
OVERRIDE FUNCTION

FIG. 5 SYSTEM OVERVIEW

MULTIFUNCTION OPERATORS IN CALL CENTER

ACD= AUTOMATIC CALL DIRECTOR
OPRS= OPERATORS
SN-SOCIAL NETWORK
SM=SOCIAL MEDIA

HIGH VALUE INFORMATION ALERT AND REPORTING SYSTEM AND METHOD

CROSS REFERENCE TO RELATED APPLICATIONS

This application claims the benefit of priority to U.S. Provisional Application Ser. No. 61/762,429 filed Feb. 8, 2013, the entire application of which is incorporated by reference thereto.

FIELD OF INVENTION

This invention related to information dissemination and reporting, and more specifically to methods and systems for providing multimedia-multi-mode information acquisition, management and distribution systems for retrieving High Value Information (HVI) for the benefit of the public, profiling wanted persons and persons of interest, predicting the profiled persons locations and whereabouts in order to aid law enforcement investigation and apprehension of the profiled persons, and for public service announcements and targeted advertising, and the invention has direct applicability to assist in the war on terror, and assist in the apprehension of terrorists as well as local law-breakers and other individuals who prey upon the vulnerable persons of our society.

BACKGROUND AND PRIOR ART

There have been many individual efforts to provide information to public, and receive information from the public, but these have mostly been small-scale, isolated, and not integrated into a consolidated, unified effort. In addition, there has been little effort to consider the public as an integral element in the information infrastructure. Only recently, has there been some simple efforts to employ predictive analytics into the process and to expand the communications means to include the social media networking. Most of today's systems of information acquisition, distribution, and display are focused on marketing and sales of commodities, whereas the High value information Alert and Reporting System (HARS) first priority is focused on objectives related to law enforcement, and the identification and apprehension of wanted criminals, terrorists, and suspicious activities.

In those information acquisition and distribution efforts related to law enforcement, academia has expended considerable thought, paper and dollars to produce a plethora of possibilities on how information should be collected and shared among various law enforcement organizations, but comparatively little effort has been placed on the benefit of harnessing the power of the public to become an integral part of the information transfer process.

The public is large body of people which constitutes all aspects of our society. There is a tremendous amount of information that can directly benefit the public. In addition, the power of the people can be a powerful tool to help make communities a safer place to live. By including the public in the dissemination and collection of information, the "public eyes" can help locate criminals and/or missing persons. Every day, public safety officials receive tips from the public in many different ways and with varying degrees of accuracy. In fact, it is well-established that the public has been very successful in helping law enforcement by providing timely information on highly publicized cases to which the public has been solicited for information.

However, few concerted efforts have been made to harness the public eyes in assisting law enforcement and other government agencies with the day to day happenings within our communities. Some current examples include: electronic message boards along the highways, electronic billboards in cities, and television programs like America's Most Wanted. These efforts have been successful to some degree, however each approach is limited in scope, and tends to be a broadcast of information, in a shotgun approach, which results in the majority of viewers not being in a position or location to help.

To this end, the need exists for a system and method to allow high value information to be disseminated to and received from the public, particularly when the distribution of the information is precisely targeted to locations where the public is in the best position to achieve positive results.

There are a wide variety of existing techniques which have been offered to collect information from various sources and to provide information to the public. However, each is limited in scope. In some cases the communications is only to dedicated terminals or designated/enrolled persons. In most cases, the focus is extremely limited and only addresses a small, discrete, physical area. Newer technologies such as the "Cloud", predictive analytics, smart databases and social media/networking are only just beginning to be considered, whereas HARS incorporates these technologies and they are integral to its functional operation. Extremely few of the current art integrates the public into the design and creates a linkage into current Law Enforcement Agencies (LEAs) and facilities such as Fusion Centers.

HARS is scalable and is an open system, which makes it extremely versatile. Implementation can range from a stand-alone, single facility implementation to an international implementation. HARS is a system, which integrates many disparate systems and efforts into a homogeneous operation. Another aspect of HARS is that it includes the interfaces to incorporate other, Non-HARS systems and networks into HARS to create an "expanded" network to achieve increased efficiencies and effectiveness through increased scale of equipment and operations.

SUMMARY OF THE INVENTION

A primary objective of the invention is to provide methods and systems for multimedia-multi-mode information acquisition, management and distribution systems for retrieving High Value Information (HVI) for the benefit of the public.

A secondary objective of the invention is to provide methods and systems for profiling wanted persons and persons of interest, and for predicting the profiled persons locations and whereabouts in order to aid law enforcement investigation and apprehension of the profiled persons.

A third objective of the invention is to provide methods and systems for public service announcements and targeted advertising.

A fourth objective of the invention is to provide methods and systems for direct applications in the war on terror by assisting in the apprehension of terrorists as well as local law-breakers and other individuals who prey upon the vulnerable persons of our society.

The High value information Alert and Reporting System (HARS) is a multimedia-multi-mode information acquisition, management and distribution system for High Value Information (HVI) for the benefit of the public, and more specifically for profiling wanted persons and persons of interest, and to predict the profiled persons locations, and whereabouts in order to aid law enforcement investigation, and apprehension of the profiled persons.

The High value information Alert and Reporting System (HARS), and methods to integrate the public into the law enforcement process is accomplished by providing information on specific wanted persons/persons-of-interest (get the bad guys) to a diverse range of information display devices specifically selected to display the information to the public. The information is displayed on each, individual selected monitor in accordance with a Playlist specifically designed for that individual monitor or network.

Wanted persons/persons-of-interest are profiled by behavior, acquaintances, and predictive behavior algorithms are used to predict locations and venues where there is a higher likelihood the person can be found, and then information on that person is provided to the public in each of those specific areas, and more specifically, to specific display monitors in those specific areas. When the public observes the wanted person, it is then reported to HARS, which in turn notifies the proper Law Enforcement Agency (LEA) for investigation and apprehension.

The invention provides a basic infrastructure that can also be used for providing public service information to the public in the precise area where the information is needed, and can provide commercial advertising information to selected target areas, monitors, networks, and venues. The invention also uses social media as well as traditional media to both gather information on the bad guys as well as assist in apprehending the bad guys. The social media helps provide a near ubiquitous means of communications between the public and HARS.

Functional Employment of Invention

The same infrastructure of the invention can be employed in three embodiments. The first and primary embodiment is to provide an information and communications infrastructure to "catch the Bad Guys"; criminals, local thugs and international terrorists. The second is to provide important, and time critical information to the public, and the third is to provide an infrastructure to assist companies in advertising. The economies of scale are mutually supportive.

HARS is an infrastructure, which has integrated its own dedicated, new infrastructure with existing infrastructures to form an integrated, interactive "expanded infrastructure", thus profoundly increasing its size and presence in the public, which correspondingly increases its effectiveness. The HARS infrastructure allows for direct interface to other existing networks such as the Walmart information network, Target network, 7-Eleven network, Redbox network and other commercial and government networks. In each of these other networks, agreements may be established on the extent of the interconnection between the networks and what HARS information will be allowed on the other network and the criteria of how HARS will be allowed to use the other network. The net result is the creation of a combined, or "expanded network", which is the composite of all networks functioning with a commonality of purpose.

The HARS infrastructure provides a capability, which exploits the "expanded infrastructure" to deliver high value information to the public and to accept high value information from the public. It is powerful and pervasive because it incorporates a fundamental, critical element into its system . . . specifically, the "EYES of the PUBLIC". It's functionality is unique because it is a combination of an ALTRUISTIC capability to help get the local thugs, criminals and terrorists off the street, making our community and country a safer place. AND, it is an infrastructure to delivery time-sensitive public service information to the public. AND, it is an infrastructure, which presents unheralded opportunities for marketing and revenue generation because of its extensive presence through a very large number of passive and interactive displays and communication devices.

HARS is not revolutionary, it is an evolutionary system, which is now possible due to the confluence of capabilities in information management, monitors and displays of all kinds, and the diversity of communications means and devices including social networking. All of the individual capabilities are available. The High value information Alert and Reporting System (HARS) is created from readily available, off-the-shelf hardware, software, and currently available, commercial services. HARS integrates these pieces into a integrated foundation, which has many, many applications.

The public is a tremendous resource, largely untapped, to help law enforcement, and the public is ready and can be an active part of the law enforcement process—they want to be involved, but how? The problem is the power of the public is not being harnessed—they just don't have the tools to help. HARS will provide the public the tools and information they need, AND provide the information in a highly targeted or contextual delivery where only the most pertinent, high value information is provided with precision to specific locations and display devices. This is part of the premise of HARS. The other part is the using a very large number of monitors and display devices to disseminate the information on a large, pervasive scale. This is part of the "expanded infrastructure".

The HARS infrastructure is very versatile, but there are two salient purposes: ONE, to harness the power of the public eyes to identify and locate persons of interest, which might be local thugs, wanted persons, missing persons, or terrorists, and to report any suspicious activity. There has been a lot of effort in law enforcement in how to share and display information. Very surprisingly, there has not been a corresponding effort to capture and harvest raw information. TWO, using the same pervasive infrastructure, public service information can be quickly provided to the geographical areas where it is needed the most. This might be amber or silver alerts, or, warning on tornadoes, hurricanes, flooding, chemical spills, accidents or other emergencies.

The following highlights the application for getting the bad-guys . . . . Information on bad-guys is acquired from many sources through direct connectivity into existing law enforcement databases, and direct input from all levels of State and Federal organizations as well as from international sources. HARS generates a detailed profile of each individual based on the information provided and information obtained through independent research. The profile creates a detailed characterization of the person's nature, habits, hobbies, types of establishments the person is likely to frequent, geographical locations where the person has some interest, and a host of other attributes; all of which are used to build a comprehensive profile of the person. The individual profile is unique from other profiles because it is specifically tailored to characterize the person's behavior. This information is then used in "predictive behavioral algorithm" used to predict behavior in given situations and more specifically, to predict places and locations where a person might tend to go, and the venues where they is a greater likelihood they may tend to be found.

All the profiles are in a HARS database which is accessed by the central, HARS Playlist Generator, or Algorithm. In HARS, a Playlist is unique list of profiles which have been created for a specific monitor, display device, Smartphone or a server for subsequent delivery to a group of monitors or users. Additional information on this is available elsewhere in this patent.

A HARS Communications Controller manages the delivery of the Playlists, and can also interlace advertising, and in some cases, can interrupt the normal delivery of Playlists with priority or emergency notifications.

If a wanted person is identified by the "Public Eyes", a call is made to the HARS Call Center for induction, screening, and action. The HARS operator has the ability to directly call law enforcement responders, or to take any other action as specified in the profile for that specific person. Each individual profile has specific instructions on what the HARS operator should do when "hit" occurs (the HARS operator is notified that a wanted person is sighted). The HARS operator can manage the notification to the authorities and will not release the caller until appropriate to do so.

First, there are dedicated HARS display monitors, which are referred to as Alert Response Monitors, or ARMS. These can be connected by a variety of means to the HARS Command and Control Center and the central computer where the Playlist is generated and information is sent to the display monitors. Connectivity can be on dedicated lines, Ethernet, satellite, or through the Internet. With the growing availability of Internet-capable TVs, Internet connectivity becomes an easy option.

However, there are many existing systems that have display monitors, which have the potential for multi-use. Multi-use is when the company owning display monitors (such as in the "expanded network") for its in-house application also permits the use of these monitors to display application information from one or more other companies.

In the case of multi-use with HARS, there can be a distinct advantage for the owner because HARS can enhance the effectiveness of the owner's objectives for their own application. This is because when HARS captures the public eyes, the public eyes can be on the monitor when the owner interlaces their corporate application and advertising, thus increasing the effective delivery of the corporate information.

There is a potential benefit for multi-use display monitors—certainly, this presupposes agreements with the owners of the monitors, but as implied, there can be a potent, symbiotic benefit to both the monitor owner and HARS. This is a KEY POINT. The owner of the networked system with monitors can receive a favorable attitude from the public for showing the HARS information and the owner can also benefit by taking advantage of the public "Eyes On", which can be watching HARS when his application or advertisement is interlaced with HARS.

Further objectives and advantages of this invention can be apparent from the following detailed description of the presently preferred embodiments which are illustrated schematically in the accompanying drawings.

DESCRIPTION OF THE PREFERRED EMBODIMENTS

Before describing the disclosed embodiments of the present invention in detail, it is to be understood that the invention is not limited in its applications to the details of the particular arrangements shown since the invention is capable of other embodiments. Also, the terminology used herein is for the purpose of description and not of limitation.

Figure 1:
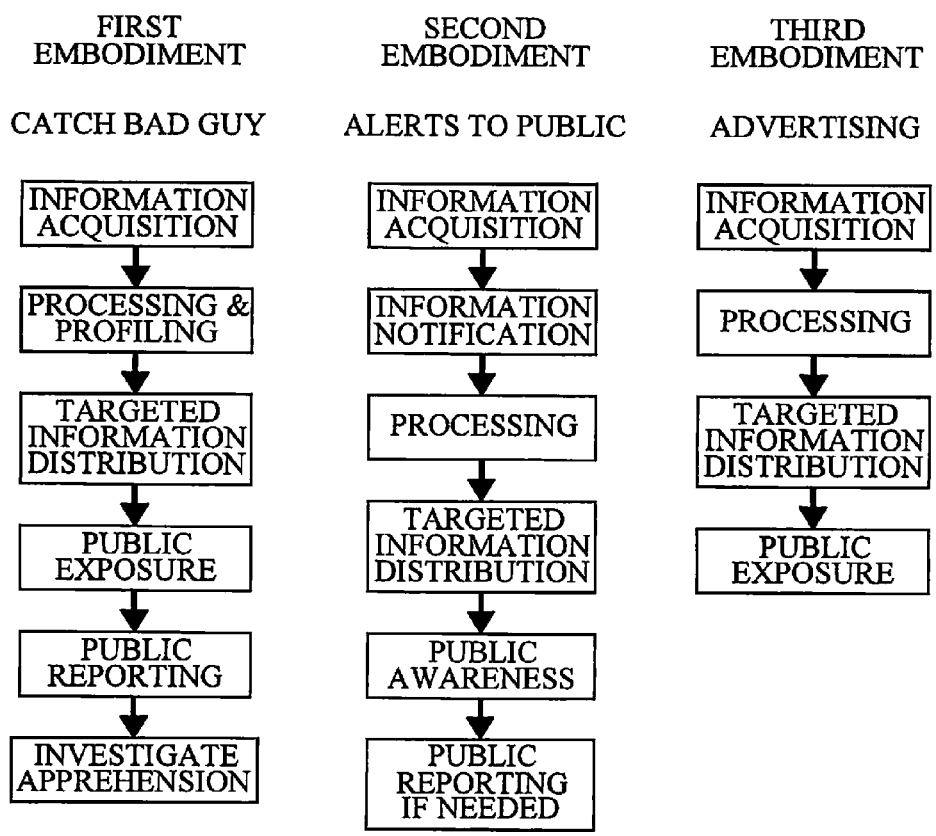
FIG. 1 shows three different functional block diagrams showing the primary steps for catching a bad guy in embodiment one, providing alerts to the public in a second embodiment and advertising in a third embodiment.

A primary embodiment of the "High value information Alert and Reporting System", (HARS) is to provide a system which can facilitate the detection, identification, and apprehension of the "bad guys". Law breakers and persons who are wanted by the authorities or are persons of special interest. The strategy implemented by HARS is to provide information to the public on the bad guys and encourage and enlist the power of their omnipresence and their eyes in the process as a partner in the process. HARS provides information on the bad guys which is delivered to target locations where there is an increased likelihood the target person can be located. The public sees the Bad Guy and reports it to HARS who in-turn notifies the appropriate law enforcement agency for investigation and apprehension as appropriate, according to the instructions in a database associated with that particular Bad Guy. The embodiment to "get the Bad Guys" is shown in FIG. 1, Column 1. Also shown in this Figure is the second embodiment, "Alerts to the Public, and the third embodiment, which is "Advertising".

The HARS infrastructure can be assembled from commercial, off-the-shelf hardware, software, and commercially available services. It is the assembly of these and their application that is unique.

Some of the HARS components include, but are not limited to the following: Monitor and display devices, electronic billboards, wireless telephone networks, social media network, computers, computer storage mediums/memory capacity, intelligent databases, cloud computer processing, cloud memory storage, data mining programs, predictive programs, predictive behavioral programs, analytical programs, and many other hardware, software and off-the-shelf services.

While the specification concludes with claims defining the features of the invention that are regarded as novel, it is believed that the invention can be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As can be appreciated by one skilled in the art, aspects of the present invention can be embodied as a system, method or computer program product. Accordingly, aspects of the present invention can take the form of an entirely hardware embodiment or an embodiment combining software and hardware aspects that can all generally be referred to herein as a "circuit," "module," "unit" or "system." Furthermore, aspects of the present invention can take the form of a computer program product embodied in one or more computer readable medium(s) having computer readable program code embodied thereon.

Any combination of one or more computer readable medium(s) can be used. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this application, a computer readable storage medium can be any tangible medium that can contain, or store a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing. Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can be executed entirely on the user's computer, partly on the user's computer, as a stand-alone software package, partly on the user's computer and partly on a remote computer or entirely on the remote computer or server. In addition; the program code can be executed entirely in the "Cloud", partly in the "Cloud" or in combination of the "Cloud" and one or more of the user's computer. The remote computer and/or "Cloud-based" computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It can be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts/process specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is to be understood that the software processes referred to in this invention are merely exemplary of those used in the invention. The invention uses commercial, off-the-shelf software and services, which are applied to the functional objectives of the invention. The specific processing and functional details disclosed herein are not to be interpreted as limiting, but merely as a basis for the claims and as a representative basis for teaching one skilled in the art to variously employ the inventive arrangements in virtually any appropriately detailed structure. Some examples of currently available, commercial, off-the-shelf software products include the following, but are not limited to the following: Predictive Analytic Tools such as; Angoss Knowledge STUDIO, IBM SPSS Statics, IBM SPSS Modeler, KXEN Modeler, Mathematica, MSTLAB, Oracle Data Mining (ODM), Pervasive, SAP, SAS Enterprise Miner, STATSTICA, and TIBCO.

Regression Analytical Techniques such as; Linear regression model, Discrete choice models, Logistic regression, Multinomial logistic regression, Probit regression, Logit regression, Time series model, Survival or duration analysis, Classification and regression trees, and Multivariate adoptive regression splines.

Machine Learning Analytical Techniques such as; Neural networks, Radial basis functions, Support vector machines, Naïve Bayes, k-nearest neighbours, and Geospatial predictive modeling.

As used herein, High Value Information (HVI) can include any type of information provided to or from the public that can be used to aid law enforcement in ensuring the safety of citizens.

A High value information Alert & Reporting System "HARS" can include a system having a database (or a plurality of linked databases) configured to receive high value information from a plurality of sources including commercial companies, government agencies, Law Enforcement Agencies (LEAs) and the public at large. This information can be used to generate profiles on individuals who are wanted or missing, for example; and these profiles can then be distributed to the public at large. Additionally, HARS can provide a means for receiving tips from the public (such as a positive identification of the wanted person, for example) which can then relayed to responders within the community. HARS can also receive reports from the public on suspicious activities, which in LEAs are referred to as Suspicious Activity Reports, or SARs. These are an important tool in the LEAs but the public's participation has not been encourage encouraged. HARS extends these reports into the public domain. HARS will generate these reports from information received from the public and enter them into the formal system for receiving and processing these reports.

FIG. 1, labeled as "FUNCTIONAL EMBODIMENTS", illustrates the three basic, functional embodiments of the High value information Alert and Reporting System (HARS). The same infrastructure can be used to implement each of these three embodiments. However, it should be appreciated, that the invention is not limited to the precise arrangements and instrumentalities shown. In addition, some functionalities may be achieved through implementation of only a subset of the HARS infrastructure.

The first and most important embodiment is the one to "get the bad guy". As shown in FIG. 1, information on the bad guy is collected and processed to create a detailed profile using a predictive behavioral algorithm. After the profile is created, wanted information is disseminated to those locations where the bad guy has the highest probability of being found. The distribution can include dissemination to the public in which case the public eyes observe the bad guy and report the sighting to HARS which then notifies the appropriate law enforcement agencies or takes other action as specified in the profile for that specific tad guy'.

The second embodiment is alerts to the public. As in the 'catch the bad guy' embodiment, in the first step information is acquired. Based on the information acquired, warnings and informational announcement are provided to one central location, HARS, where the information is disseminated to display devices, such as cellular telephones, laptop computers or tablets in the target receiving area. In response to receiving the disseminated information, the public has the opportunity to provide updates or additional information when it is appropriate. In this embodiment, the public is engaged in providing improved information which can then be disseminated to the public as an update.

The third embodiment is advertising information. Similar to the first embodiment, the information is collected and processed. The processed information can be disseminated to targeted areas on a non-conflicting, interlaced basis to the information being distributed in the first two embodiments. The processed information can also be separately distributed as Targeted Information Delivery (TID) when certain criteria are met and when owners of the display devices authorize receipt of the information.

Figure 2:
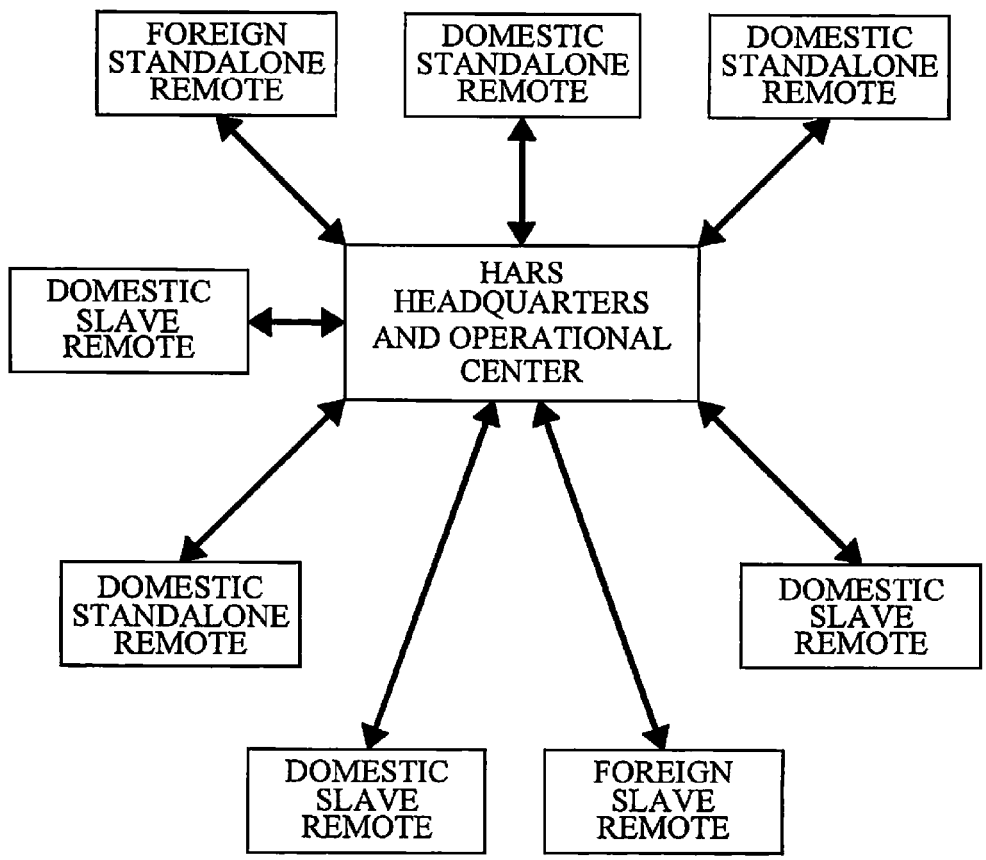
FIG. 2 is a block diagram showing the HARS global domestic and foreign operations including standalone and remote operations.

FIG. 2 is a block diagram showing the "HARS global network, domestic and foreign operations, standalone and slave remote operations." As shown, the slave remote operations is scalable with the global flexibility of HARS. The main HARS system is centrally located and can use local processing and database storage, processing and storage located in the "Cloud" or a combination thereof.

In addition to the central HARS facility, there can be one or more "mini-HARS" which have the same capabilities, except on a much smaller scale. As such, it can operate independently either domestically or overseas and when appropriate it can share information and integrate the information of one into the operation of the other. A "micro-HARS" is a smaller version of the mini-HARS, which can be a computer terminal with an Internet connection for sending and receiving information to and from the Central HARS.

A "foreign remote slave" HARS can be located domestically or overseas. In this example, the foreign remote slave can act as a "concentrator location" and relay information back to the Central HARS. For example, if the foreign remote HARS is overseas, phone calls and other data exchanges can be received at the remote HARS and then relayed back to the Central HARS Call Center in bulk, where operators with appropriate language skills are located. All of the operation of the foreign remote slave HARS would be under the control of the main HARS Headquarters and Operational Center.

A "foreign standalone remote" or "domestic standalone remote" HARS can have a fully functional HARS facility, but the facility would be on a significantly reduced scale. In essence it would be a peer of the main HARS, but would be much smaller and might not have all the functionality of the main HARS facility. Information would be exchanged with the main HARS operation on peer basis.

As shown in FIG. 2, regardless of the alternative type of HARS facility, the facility is required to be in communication with the centrally located HARS headquarters and operations centers and information collected and actions taken by the alternative HARS facilities would be required to comply with the central HARS rules, standards and decisions.

Figure 3:
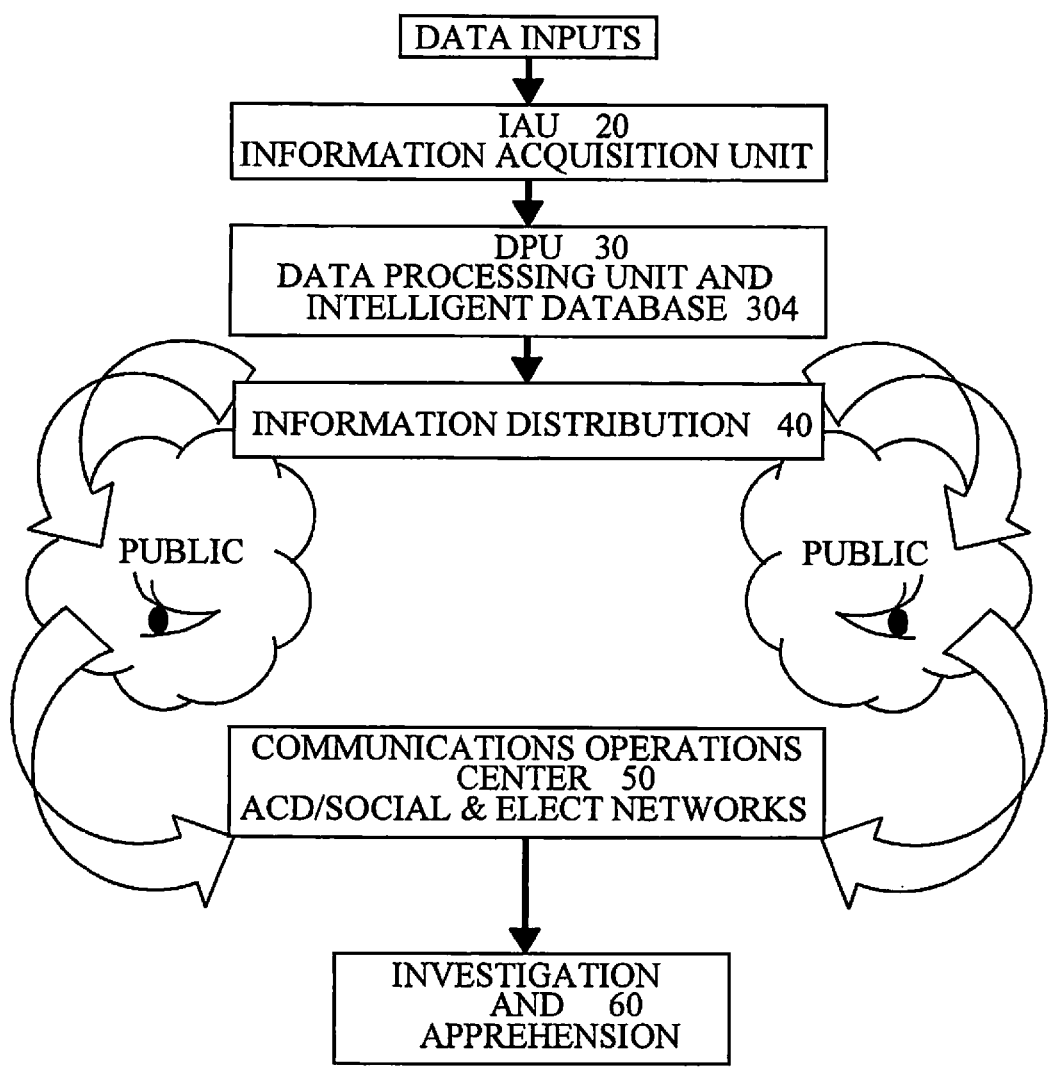
FIG. 3 is a block diagram showing the basic HARS infrastructure.

FIG. 3 is a block diagram labeled "basic HARS Infrastructure" that shows the basic functional elements of the HARS infrastructure. The first element is the large number of raw data inputs, which are directed to the Information Acquisition Unit (IAU) 20 which re-directs the information to the data processing unit 30. The Data Processing Unit DPU 30 and Intelligent Database 304. This is where the database information is processed by the various algorithms, the Playlists are created, and the various other processing functions are accomplished which are described in more detail later.

After the information is processed and stored as an intelligent database, the information is ready for distribution from the Information Distribution Unit IDU 40. The essence of the High value information Alert and Reporting System (HARS) is to provide information on wanted persons to specific locations and monitors, which can have the highest probability of having the "Public Eyes" recognize the wanted person and report the sighting (a "hit"). The primary objective is to provide high value information (HVI) to the public in the specific geographical areas where it is needed the most. Other objectives include providing any information of public value and to judiciously disseminate advertising information.

The compiled information is distributed to the public according to the Playlists. The information is distributed and displayed on various individual display monitors, networked display monitors and various networks including social media networks.

After data has been received, processed and distributed, the data and public input in response to the distribution, is collected at the Communications Operations Center COC 50. The information is also distributed to the Communications Operations Center 50 which includes the Automatic Call Director (ACD) and the Social and electronic networks operations in the Communications Operations Center 50. Information provided by the public is also directed to the Communications Operations Center 50. The originally distributed information and new information provided by the public is processed for investigation and apprehension 60. In this last step, HARS notifies the appropriate Law Enforcement Agencies for Investigation and Apprehension or further action, depending on the information in individual profiles and other operating directives.

Command, Control and Override Function—CCO

Figure 4:
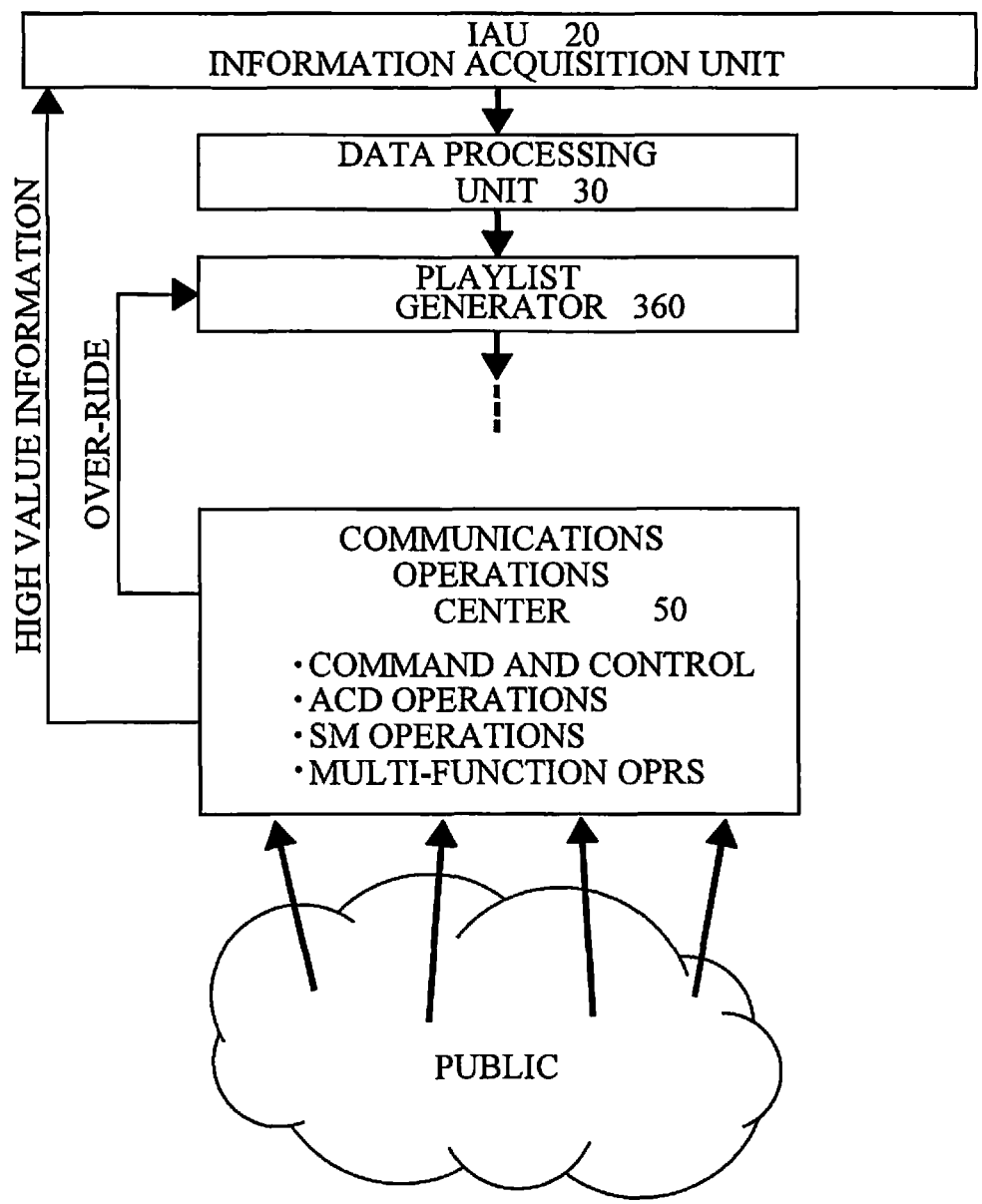
FIG. 4 is a block diagram showing the command control and override function.

FIG. 4 is a block diagram showing the Command, Control and Override Function showing some of the basic interconnections between the functional elements of HARS. Most information comes into the IAU 20 (FIG. 3) through raw data inputs shown as high value information from the communication operations center 50. As shown, the Communications Operations Center 50 has an internal capability to discover high value information through data mining in the social networks as previously described and provide the high value information to the IAU 20.

Another important aspect of the Communications Operations Center 50 is communication with other agencies shown as SM (Social Media) operations and multi-function operations. The communications Operations Center 50 also has the ability to quickly respond and alter Playlists, and can deliver information on an override basis to allow HARS to better respond to emergencies. This is particularly important in specific local, regional, or national emergencies.

Information Acquisition Unit IAU—20

Figure 5:
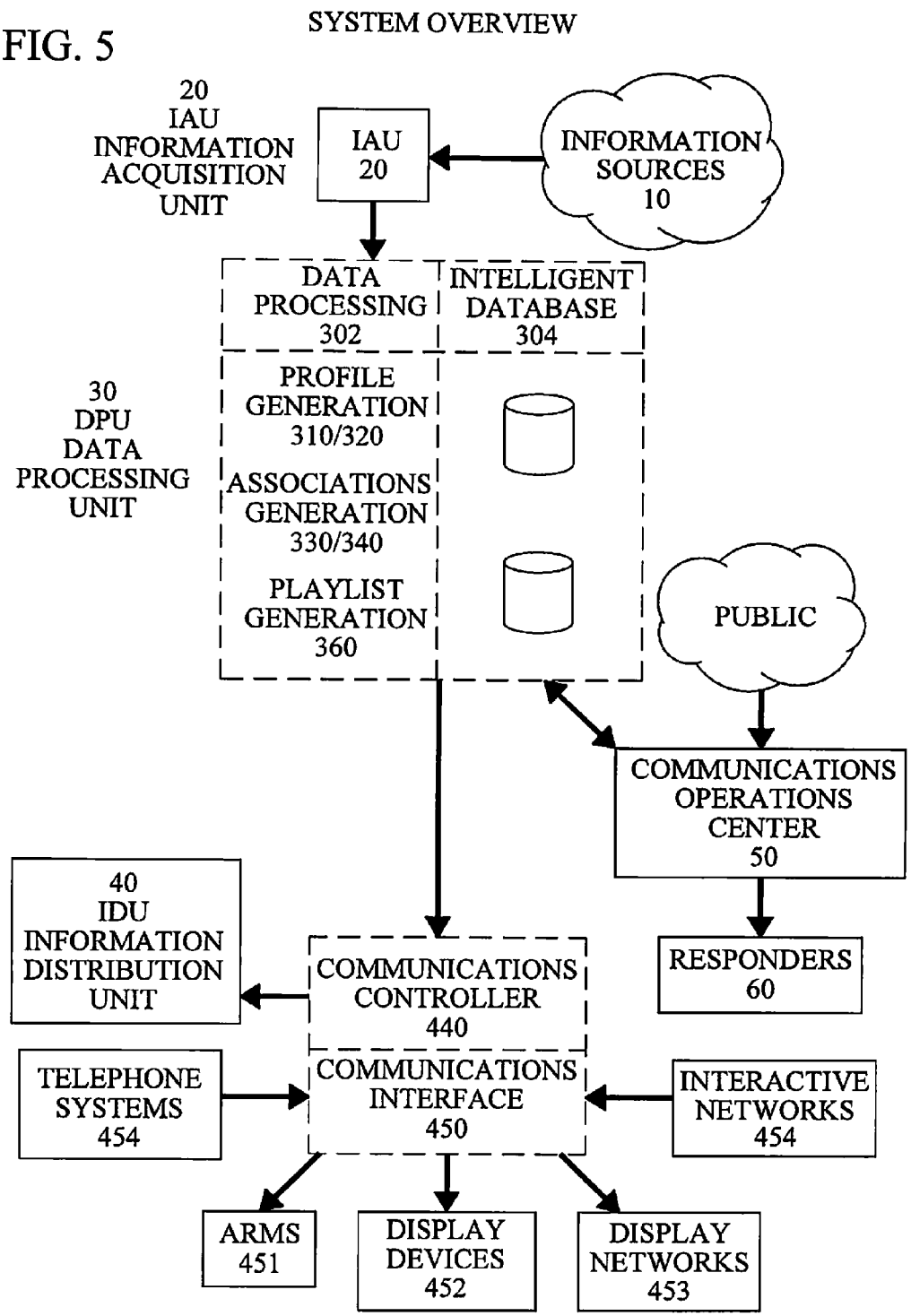
FIG. 5 is a system overview block diagram.

The system overview block diagram shown in FIG. 5 shows the major elements of HARS. The acquisition of information at the IAU 20 starts the process when the information is distributed to the Data Processing Unit 30 shown in dashed lines. The data processing 302 is connected with an intelligent database 304 where the information is stored. The DPU 30 processes the received data, generates the human and hardware profiles 310/320, generates listings and tables of associations 330/340 and generates the playlist 360. The DPU 30 is also responsible for maintaining the information in an intelligent database, ubiquitous dissemination of information, communication from the public reporting sightings of bad guys and other important/suspicious information and observations and the dispatching of law enforcement agencies to investigate and apprehend.

Data Processing Unit DPU—30

As shown in FIG. 5, the DPU 30 distributes the processed data to the communications controller 440 where the information is disseminated to, for example, the Information Distribution Unit IDU 40 and Alert Response Monitor ARM 454 which is described in more detail below. Using the communication interface 450, the information is distributed to display devices 452 and display networks 453 as previously described. The communications controller also received inputs via telephone systems 454 and interactive networks.

The data processing unit 30 also communicates with the communications operations center also shown in FIGS. 4 and 5. The communications operations center 50 receives input from the public and distributes the public input to the data processing unit 30 and to responders 60. An important function of the system is the acquisition of information by the IAU 20.

Information Acquisition Unit IAU—20

Figure 6:
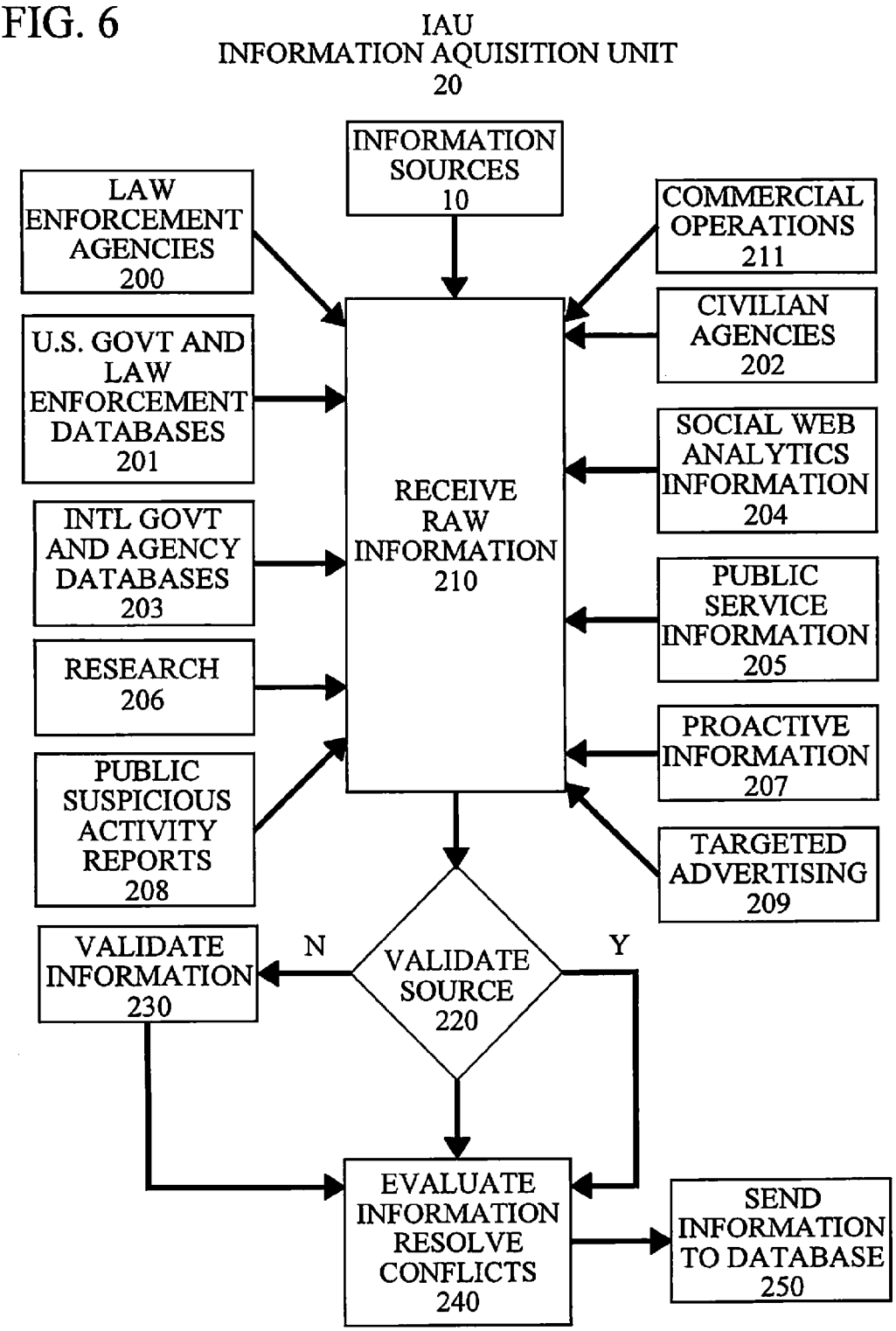
FIG. 6 is a block diagram showing the information acquisition unit.

FIG. 6 is a flow diagram of the Information Acquisition Unit IAU 20 showing some of the major sources of information that are accepted into HARS by the information acquisition unit 20. First, raw information 210 is received from a variety of different sources 10. Examples of sources submitting raw information includes law enforcement agencies 200, U.S. Government and law enforcement databases 201, international government and international agency databases 203, public suspicious activity reports 208, commercial operations 211, civilian agencies 202, social Internet analytics information 204, public service information 205, proactive information 207 and from targeted advertising. The raw information is received in step 210.

The source of the information is validated in step 220 and if the source is not validated, the information is validated in step 230. In step 240, both the validated sources and the validated information are re-evaluated to resolve any conflicts. In the source validation and the information validation steps 220 and 230, the received information from multiple sources is checked and validated and given a confidence factor. Information with a higher confidence factor can be accorded a greater importance in creating a person's profile. In step 250 the person's profile and confidence factor is stored in the intelligent database.

There is a very wide variety and sources of information 10 that can be inputted into the HARS. Information can come of existing databases, government and law enforcement sources, private and civilian sources, local and national sources and international sources. The information can enter HARS into the "Information Acquisition Unit" (IAU).

The IAU can act to receive High Value Information (HVI) from a plurality of sources on a variety of subject matter. A first example is persons of special interest. This category of information includes a variety of persons. It can include missing persons, persons who are "persons of interest" to law enforcement, missing material witnesses, terrorist persons, persons on formal "watch lists" and any person who does not fit into any of the following categories.

Another subject matter is local thugs. Community or neighborhood thugs receive little attention because of the cost and effort to provide wanted information on local, "small-time" hoodlums. However, HARS allows the local police departments and county sheriffs to take advantage of the extensive resources of HARS to focus on the apprehension of the local thugs. They can input "High Value Information" (HVI) on local thugs and the wanted information can be distributed and displayed in the local community, and the areas most frequented by the local thug.

Major Criminals are another important subject matter. Major criminals are wanted persons who have committed major, more heinous crimes and are likely to be anywhere in the United States. HARS can disseminate information on major criminals to those locations in the United States where there is a higher probability where the criminal might be hiding. This is one of the advantages of HARS—matching the criminal's profile to locations where the criminal is more likely to frequent.

Amber Alert is extremely important to get information on missing and exploited children, out to the public as quickly as possible. The Amber Alert program is a collaborative effort between the nations' law enforcement agencies and radio and television stations. Emergency bulletins are activated and broadcast to the public when a child is abducted and believed to be in danger. In 2003, President George W. Bush signed the "Protect Act", establishing a national AMBER Alert coordinator within the U.S. Department of Justice. HARS has the infrastructure and means to significantly increase the dissemination of information, which can be targeted to the child's local area and the area of the abductor, if there is a suspect.

Similar to Amber Alert is Silver Alert. The percentage of our older population is growing, which means the number of seniors with cognitive impairments, such as dementia and Alzheimer, is also growing. As a result, there are more and more older adults who "go missing" and can't find their way home. A Silver Alert System is for missing adults and it is modeled after the Amber Alert System. The Silver Alert System was introduced into some states in the 2005-2007 time period and has been expanding into other states since them. HARS can disseminate Silver Alert information more quickly with greater exposure, which means that the likelihood to locate missing adults before tragedy might happen, can be considerably improved.

There is a variety of other information which is "high value" but cannot be directly related to persons. Another area of "Information Spots" is brief educational briefs on how HARS functions. Any level of Government can provide informational spots and HARS can disseminate the information to the intended recipients—this might be a local community, county-wide, state-wide, regional, or national. Another type of Information Spots is to provide education and information on the many rewards that are available for some of the wanted persons. One reason to provide information on rewards is to provide another incentive for people to look at the information provided by HARS.

There can also be informational spots on the need and purpose of Suspicious Activity Reports (SARs) and these can educate the public on a potential bad-guy or terrorist activity and provide guidelines on how to report a suspicious activity or behavior. It is important to be pro-active in the threat from terrorists. "Information Spots", such as informative bulletins, can educate the public on what constitutes suspicious activities and how to report it.

The Information Acquisition Unit IAU 20 is shown in different configurations in FIGS. 3-6. The public is large body of people which constitutes all aspects of our society and there is a large amount of information that can directly benefit the public. In addition, the "power of the people" can be a powerful tool to help make our country and community a safer place. Collectively, this type of information is referred to as "High Value Information" (HVI) and when it is provided to the public, the public eyes can help locate the "Bad Guys" or missing persons. It has been well-established that the public has been very successful in helping law enforcement by providing inputs to them, yet there has been few, concerted efforts to harness this resource and help the public help law enforcement. Information can be consolidated from many individual sources, integrated, and provided to the public in a manner to get the most benefit.

Some of the existing efforts include the electronic message boards along the highways, electronic billboards in cities, and television programs like America's Most Wanted. These efforts have been successful to some degree, however, these have had only a small success compared to the potential success that could be achieved through a consolidated effort to provide a much larger amount of High Value Information (HVI) to a much, much larger portion of the public, particularly when the distribution of the information is targeted to locations where it is needed the most. This embodiment of the High value information Alert and Reporting System (HARS) uses existing information from a variety of sources.

Law Enforcement Agencies—200

Considerable information currently resides in Law Enforcement Databases. However, one of the objectives of the HARS is to permit rapid response of getting information into the system and out into the network for display to the public through the diverse information dissemination methods. As a consequence, direct information from Law Enforcement Agencies is permitted for high priority or perishable information, which time may not be available for entry into a database and processing for display in HARS. Information received directly from Law Enforcement Agencies may be received by email, telephone or video calls. However, as noted elsewhere, information will only be accepted from previously validated sources. Each of these sources has an agreement with HARS, which is part of the information-source validation process and each source accepts responsibility for the accuracy of the information. Each source is also responsible to update the information it provides and to remove it when it is no longer applicable.

U.S. Government and Law Enforcement Databases—201

There is a plethora of information which is currently available in Federal, State, and local law enforcement databases. Information from these sources can be accomplished through agreements with these agencies. Not all the information can be used, as only the relevant information needed to generate the profiles can be acquired (where such agreements have been secured). It should be noted that while information from all these sources may not be possible, there can be many alternate sources of the information. Where there is a conflict of information, every effort can be made to resolve the discrepancy to improve the accuracy of the agency databases and the information used to generate HARS profiles. Non-database information can also be accepted.

Information for HARS can be obtained from existing Law Enforcement Agencies (LEAs) databases (DBs), which includes all State, Federal and other Governmental departments. This is accomplished through close coordination. There can be at least one Point of Contact (POC) for each department or agency. Also, Information can be received through agreements with these agencies or via the information made public by agency websites. To this end, many government agencies currently provide a large amount of HVI on the Internet in a wide variety of sites. The information in these Internet websites is typically not seen by the public and is only available if the public makes a specific query.

Civilian/Private Agencies—202

There are many private agencies and organizations which have a particular focus and have the objective to locate people. One example is the Center for Missing and Exploited Children, which has a large database of missing and exploited children. This agency creates and distributes Wanted posters, and has their database available on-line, which is accessible to the public International Agencies/Databases—203

Data links to international agencies and databases can provide HVI. HARS 10 can act to assist foreign countries locate wanted persons and persons of interest for their country, in addition to obtaining foreign compiled information on known/suspected terrorists who can pose a threat to the United States homeland and/or U.S. interests worldwide.

Social Web Analytics Information—204

Social Media General: Information can be obtained from the public in several ways including communications received through the Internet, telephone, emails and chatting networks. Another example includes communications through Social Networking, such as FACEBOOK®, TWITTER®, MYSPACE®, and a large number of other social networks. Such a feature can provide a means for individuals to communicate HVI from a "safe and comfortable" location where the individual is already comfortable.

The Communications Operations Center 50 shown in FIG. 4, includes the Social Media (SM) operations. Information obtained through this operation can be provided to the IAU through the High Value Information interconnection.

Social Web Analytics 204 is an existing capability and service in the commercial market and government agencies, that comprehensive, sophisticated searches can be conducted on Social Media content according to very specific search parameters. This is a significant tool in searching out information on people and can be employed in HARS. Information from these searches can provide informational input into HARS.

Public Service Information—205

There is a variety of information, both of a high value information nature and educational or informative information, which is intended for public service. The HARS infrastructure is flexible and can accommodate many types of information. The following are some of the main categories.

Public Service information 205 covers a wide variety of information types, both in content and in purpose. Some of this information can be appropriate on a national basis and other information can only have value in a local community. Any organization, public or private, which has been registered with HARS can submit candidate public service information to HARS. The information provided can be validated, categorized and its various parameters specified, such as priority, frequency of dissemination, locale of dissemination and the period for the dissemination. The information can be placed into a database and accessed by the Playlist Algorithm and included in the Playlist generation (see FIG. 7).

Emergency Notifications such as public service information 205 which is urgent must be disseminated to the specific locales affected, as quickly as possible. While many of the data sources can input the information through the HARS Management and Control Center, some agencies can be given the capability to directly cause emergency alerts and warning to override the Playlists for dissemination into specified areas. However, it is anticipated that this can only be for national and state emergencies and only a few governmental agencies can have this authorization.

The more typical process for disseminating emergency alerts and warnings can occur by providing the information to the HARS Call Center Operator who can get internal authorization to execute an "Operator Over-ride" of the Playlist as shown in FIG. 4, and cause an emergency alert and warning to be generated and disseminated to the appropriate venues and geographical areas. Many of these emergency alerts and warning messages, including graphics, can be created in advance as templates, to be used when needed.

Research—206

As part of the HARS organization there can be an internal research team, which can seek out and gather information on Bad Guys from various sources and update and expand the profile on these individuals. The information can include that which can become part of the profile which can be made public and also part of the profile, which can remain restricted and can be only accessed by authorized law enforcement agencies.

In most cases, the authorized person providing the input can also provide all the information available they have on the person. This can be assembled from locally known information and it can also include information from the National Crime Information Center (NCIC) and similar State systems. If the provider does not provide this information, the research section of HARS can go to these sources to obtain the additional information. When appropriate, outside research companies can be used to obtain additional information to allow a comprehensive profile of the person to be created. In the open marketplace there are companies which specialize in information on individuals. Some of these external organizations can be under contract for further research to update and expand the Bad Guy profiles. Of particular interest is information concerning a person's personal proclivities, likes and dislikes and behavioral related information which is especially germane data for use in predictive behavioral algorithms.

Proactive Information (Future)—207

There are a number of pro-active capabilities which can be incorporated into the HARS system in the future. The following are some of the proactive capabilities which future embodiments of HARS can include. The primary enhancements are facial recognition and license plate recognition. Each can be employed differently, but the processing of the information can be similar. Another future embodiments can make use of vehicle make and model images and social networking to help acquire information on a person's behavioral patterns, circle of friends and acquaintances, likes and dislikes, and venues that are particularly frequented by the person of interest. It is noted that much of this type of data collection is currently being employed in marketing research and tailored marketing and advertising campaigns by many of today's larger companies.

Facial Recognition technology currently exists to recognize the facial features of individuals and compare the facial data to facial databases to identify persons who are in the database. This technology has been employed in public venues to identify criminals or wanted persons who were in the facial database. If facial recognition equipment is employed and there is a "hit" or match, this could trigger a response into HARS, either automatically or through manual input. When a hit occurs, a high priority can be assigned to that person's profile to cause the person's image to displayed frequently on ARMs in the immediate area where the hit occurred, thus further enhancing the probability of further "hits". As time passes, the image could be displayed on ARMs in a larger geographical area from where the original "hit" occurred.

After a predetermined time, the priority would diminish and the person's image would be displayed less frequently in the area of interest, because the playlist of the other wanted persons in that specified area should not be ignored, reducing the opportunities for other hits. A balance must be maintained to achieve the highest "hit" probability for all the wanted persons. The basic technology for facial recognition uses algorithms which are based on analysis of facial features and relative position, size, and/or shape of the eyes, nose, cheekbones, and jaw. More recent approaches use 3-D sensors to capture information about the shape of the face and claim to achieve much higher accuracies.

License Plate Recognition technology currently exists to recognize the license plate numbers on passing vehicles from either fixed cameras or cameras mounted on law enforcement vehicles. The processing of the information can be either at the location of the camera, or it might be sent to a central site for capture and evaluation at a later time. A variation of this is that law enforcement can drive through a parking lot with a video camera directed at the license plates of each parked car. The system can then recognize the license plate number and search the database for stolen or wanted vehicles (based on the license plate number).

HARS can complement the license plate recognition process. Since there can be far more ARMs in the public than license plate recognition terminals, if a license plate "hit" occurs, HARS can be used to display "Be On The Lookout For" that vehicle and license plate to assist in obtaining public eyes-on to track and/or locate the vehicle.

Vehicle Make and Model Images: Currently, a wanted vehicle can have the make, model, year, and license plate number displayed on an alpha-numeric billboard along a highway. This might occur in an Amber Alert or Silver Alert. To improve the process of locating the vehicle (either Amber/Silver Alert or Bad Guy wanted), a graphic display terminal, such as a HARS electronic billboard, along a highway, the HARS database can select a picture of the wanted vehicle make, model and color and display this picture. This can significantly assist the public in identifying the wanted vehicle and be far more effective than just displaying a wanted license plate number Public Suspicious Activity Report—208

Suspicious Activity Reporting (SAR) 208 represents an activity that law enforcement and homeland security professionals have been involved with for many years. Whether they are called field reports, incident reports, or various other names, agencies have long had processes in place to receive tips and leads, evaluate/investigate the information, and take subsequent action, such as reporting, creating documentation, or referring the information to another jurisdiction or agency. Unlike incidents that are clearly criminal in nature, such as car thefts, burglaries, or assaults, a SAR 208 involves the reporting of suspicious behaviors or situations that have been associated with terrorist activities in the past and can be predictive of future threats to public safety.

Observed behaviors can include such activities as surveillance or photography of critical infrastructure or monitoring of facility security processes. Although these behaviors may not be illegal, they could be potential indicators of suspect activity that should be recorded and investigated by law enforcement agencies charged with this mission.

Law enforcement personnel are educated on what constitutes a suspicious activity and how to file a report. HARS can bring the public into this process and they can also submit a Suspicious Activity Report. When this occurs, it can provide an important information input, which can be processed by HARS. One, extremely important example is the need for the public to be educated to look for "suspicious activities" which can be related to terrorist actions or criminal-related behavior.

Historically SARs are only created by Law Enforcement Agencies (LEAs). The personnel who create these report have been specially trained and the reports are used within the law enforcement communities. However, HARS believes this practice is an impediment to the encouragement of public participation to identify suspicious activities and reporting on their observations. One of the HARS objectives is to promote greater use of the "Public Eyes" to help "Get the Bad Guys". HARS operators can be trained in the proper interviewing techniques and the proper procedures to prepare Suspicious Activity Reports.

When HARS receives information from the public that meets the criteria for a SAR 208, the HARS operator will generate the SAR and will submit it to into the appropriate channels for reporting. The HARS operators can be trained in interviewing techniques to gather all the relevant information from the public caller to create a well documented SAR. By including the public in this process, a greater number "eyes on" will be brought into the process of detecting potential harmful activities to our communities and country.

Targeted Advertising—209

Figure 12:
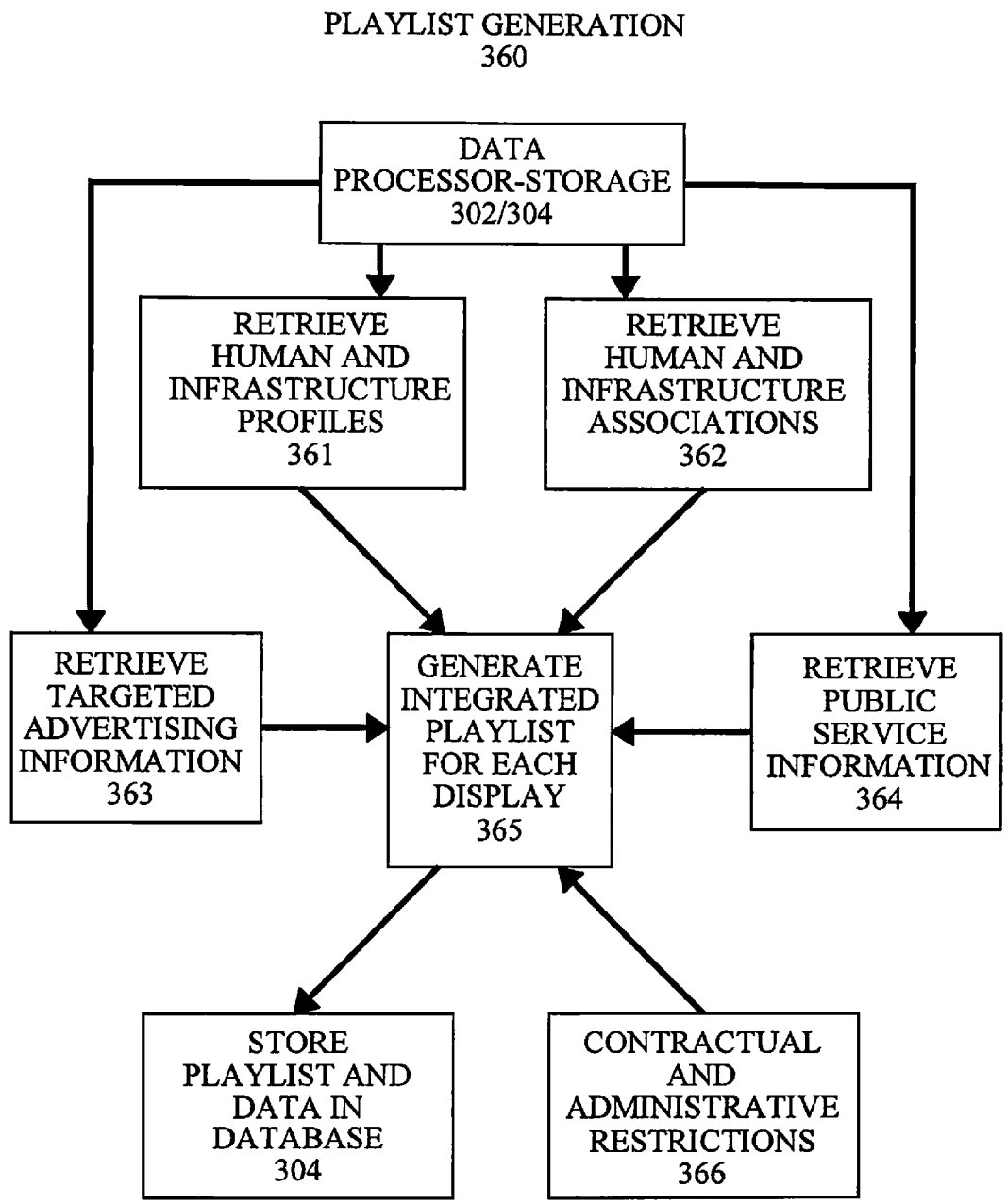
FIG. 12 is a flow diagram for playlist generation.

Targeted Advertising is advertising of a specific nature which is intended to be displayed on a specific Alert Response Monitor (ARM), family of monitors, or specific networks. Targeted Advertising can conform to previously established criteria of permissions/approvals to use those monitors for such advertising. Thus, the owner of each display monitor, family of monitors, or network(s) must establish what kind of advertising is permissible and the conditions for which such advertising will be displayed on the monitors owned by that party. This information will be maintained in a HARS database and used in subsequent system processing and generation of integrated Playlists for each display. This is shown in FIG. 12, "PLAYLIST GENERATION—360", in the processing box "CONTRACTUAL AND ADMINISTRATIVE RESTRICTIONS—366".

Commercial Operations—211

There can be many commercial companies which can have a HARS relationship. This can typically be in situations where the commercial company has display networks, which can be multi-functional, used for both their corporate purposes and for dissemination of HARS high value information. The terms of these agreements 366 must be in the database because they are a data element which can be used by the Playlist Generator to create Playlists shown in FIG. 12. In addition, targeted advertising information can be used in HARS Playlists. It is critical that the terms of the display of advertising information be specified and allowed by the owner of the multi-use display and that any HARS advertising that appears in any location be with the consent of the owner of the venue where the display monitor is located.

Commercial Inputs: HARS provides an infrastructure which can be used in more ways than to only disseminate High Value Information. One application includes public service announcements and informational spots for education. HARS can also be used for commercial advertising for revenue generation. The manner and frequency of commercial advertising and whether it is permitted or not depends on the ownership of the Alert Response Monitors (ARMs), where it is located and contractual agreements 366 in place. This information can be maintained in the HARS databases and is a parameter in interlacing commercial advertising and high value information. The following addresses two of the basic embodiments of commercial advertising and HARS.

Internal Material & Control: An individually owned store or a store which is part of a chain can determine the nature and parameters of commercial advertising which it can allow on the Alert Response Monitor located in their store(s). There is also options of store-owned ARMs or non-owned store ARMs. The various options can be identified and those agreed to can be specified in a contract. One option is that only store provided advertising material, internal to the store operation, can be allowed to be interlaced with ARM high value information.

Depending on contractual agreements 366, either the store owner can input advertising material directly into HARS for interlacing with the HVI, in which case, the material can be transferred into the ARMs Communication Controller, thus the advertising material can be controlled and inputted locally.

The other option is that internal advertising information can be submitted to the HARS Management and Control Center, who can prepare the material and input it into the advertising database for the store. A third option is that there can be a combination of store advertising material and non-store, or external commercial advertising information. Another option is that no commercial advertising can be on the ARMs. The options employed can be specifically identified in a HARS database. The preceding options are only illustrative and are not limiting to the possible options for use.

External Material & HARS Control: Another category of commercial advertising is advertising material, which is not related to the store ownership or operation—it is externally generated advertising material. The manner and parameters on the nature of the material and how it can be disseminated can be specified in a contract which can contained in a HARS database. The company providing the external advertising material can have specific dissemination objectives, which can be an input to Playlist generation. However, the actual control of the dissemination can be entirely by HARS.

Raw Information Registration & Logging—210

It is important to insure that input information is from authorized sources and that is it properly categorized, cataloged and placed into the appropriate databases. The heart of HARS is how the information is manipulated to generate targeted Playlists for display on targeted monitors and networks. This stage in the process is the foundation to build the explicit databases upon which subsequent operations can be performed. The following highlights some of the information sources, however, it is understood that those listed are examples only and that there are many more than are identified here.

Validated Source—220

The accuracy of the data and its authenticity is extremely important to prevent wrongful action by HARS based on faulty information. As a consequence, many checks and counter checks are made. While some checks are automated, others are performed by trained HARS personnel. Information is stored in an intelligent database that continually receives duplicative, redundant and time-varying information. The benefit of the intelligent database is that it checks and updates information to ensure the most accurate and timely information is maintained in the database, which is subsequently used by other HARS processing actions.

Information from unauthenticated sources can be marked accordingly, with a low-level of validation. Only positively known sources can receive the highest level of validation-of-source. All information acquired will be assigned a number representing the confidence level of the information and will be used accordingly in subsequent processing. Low confidence level information may not be used at all, but will remain in the database and will be available to researchers who have a need to further research or investigate a person in the database.

Information Validation—230

Another step in the process of collecting information is that every informational input is validated and a level of "believability" (referred to as a confidence level) is assigned to that informational input. This can be accomplished through the information transfer over a data link to another data source which is known and the communications link is secure. When the input is from a person, whether by phone or email, only pre-registered, authorized sources are permitted to provide an input. If for some reason an input is attempted which has not been previously authorized, the person attempting the input must go to an authorized source to have the input submitted.

Organizations or agencies that provide information inputs can decide who in their organization can be designated as authorized to provide inputs. Authorization can be validated by user IDs and passwords. In some cases only authorized terminals can be used, in which case, hard-coded identification information can be either imbedded in the terminal or can be accessed through a USB device, a secure ID card, or other device, which can have the imbedded identification information. In addition, there are other means to validate the person providing information. In this category are devices that can recognize a thumb print, voice, iris recognition, and facial recognition.

Evaluate Information—240

Much of the information can be automatically inducted and after processing be placed in the database. However, some information can be flagged for review by a specially trained HARS agent. The agent can examine the information and will make certain judgments as to its relevance and other possible linkages. The agent will have the capability to call up other databases and information as he/she pursues the evaluation.

Send Information to Database 250

When the agent's evaluation and research is complete, the information can be properly flagged and entered into the database 304 for subsequent processing.

Figure 7:
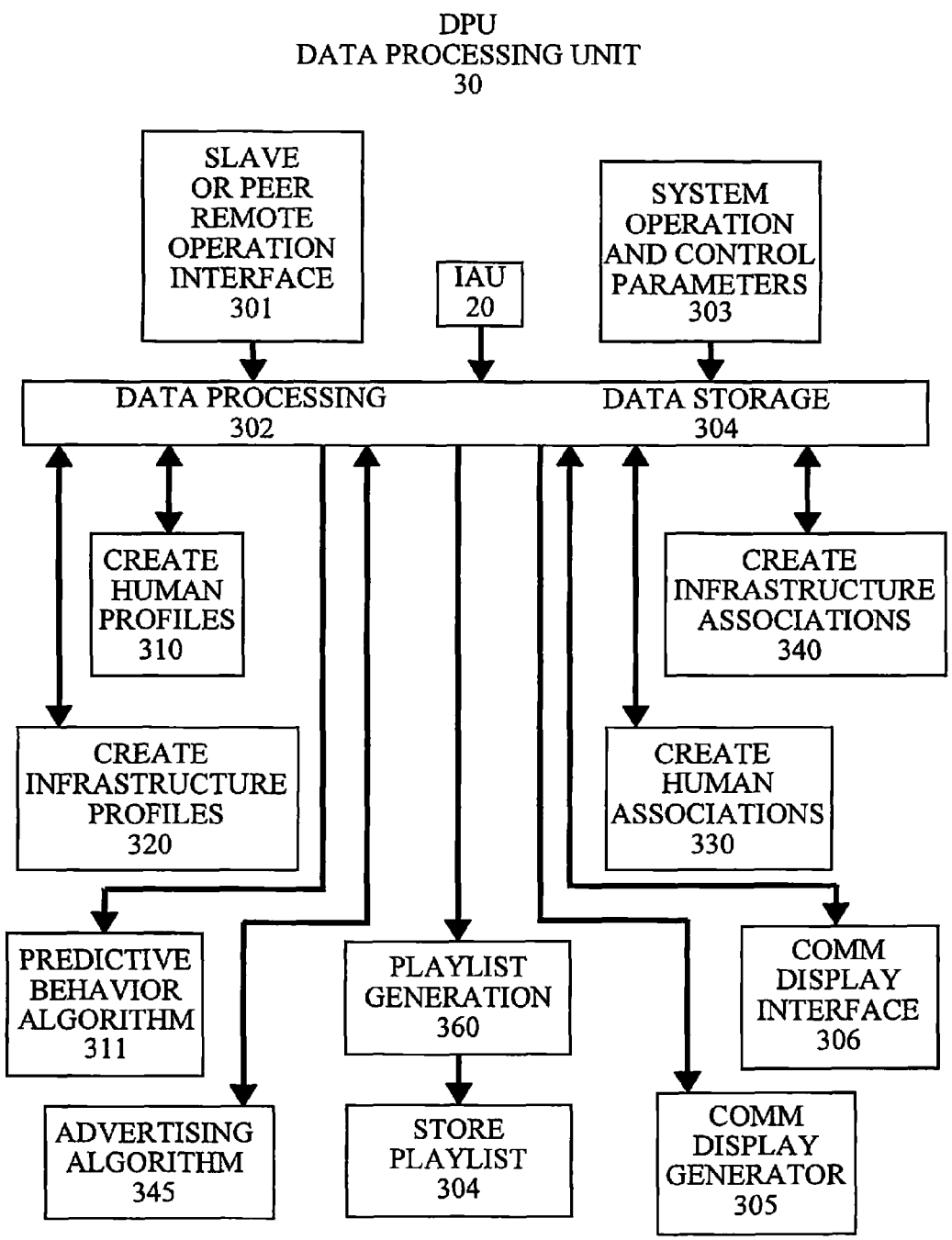
FIG. 7 is a block diagram of the data processing unit.

FIG. 7 is a block diagram showing the elements associated with the Data Processing Unit DPU 30. The DPU performs a variety of processing routines, which include predictive behavior algorithms 311, the identification of relations between individuals, friends, and relative 330, the physical relationships between display monitors 306, generation of Playlists 360, and the formatting of displays for different types of displays 305, and includes interactive programs to provide information.

As shown, the DPU 302 includes data storage 304 such as databases of information and algorithms for performing the tasks shown. Information is received from slave or peer remote operation interfaces 301, the IAU 30 and system operation and control parameters 303.

At the DPU 302, human profiles are created 310, infrastructure profiles 320, infrastructure associations 340, and human associations 330 are created. The created profiles and associations are stored for example in the data storage unit 304. The DPU 302 also generates predictive behavior algorithms 311, advertising 345, playlists 360 and the like.

Data Processing Unit DPU—30

The Data Processing Unit 30 is shown in FIGS. 3-5 and 7-12. The HARS infrastructure is functionally very versatile and from a hardware and software perspective, is very scalable and expandable because it is mostly an open system, open architecture and using off-the shelf hardware, software, and commercially available services as explained previously. Any proprietary hardware, software or services would be unique to the company providing these products and services to HARS. Because HARS is scalable it promotes ease-of-implementation. The more HARS system are implemented, expanse of effectiveness increases.

Slave or Peer Remote Operation—301

Referring back to FIG. 2 in conjunction with FIG. 7, the Data Processing Unit (30) is shown, as an example, with communication connections to remote slave and remote peer HARS data processing units.

A remote slave HARS unit would typically be at a distant location, which is not operating autonomously. It would be merely be a extension of the operation at the primary HARS where the main data processing unit is located. This type of operation might be used for economy of scale operations to concentrate communications in a geographical area and transport it in bulk to the HARS Headquarters and operations center as shown in FIG. 2. This might also be the case to concentrate voice telephone calls, perhaps in a foreign country, and transmit them to the U.S. where the U.S. ACD telephone operators are located. These operators would have the appropriate language skills.

A remote peer HARS could be a complete operating and functionally capable HARS, capable of operating independently. This might be the case if a foreign country were to implement HARS but desires to share certain information with the U.S. HARS operation. The electronic communications interconnect between that peer facility and the U.S. HARS can occur at the HARS Communications and Control 50, which can provide the computer data link to the HARS Data Processing Unit (302). Associated with a remote peer HARS, can be "peer processing portal", which can contain all the rules for information sharing between the main HARS processor and the peer HARS processor. These rules can be mutually established between the respective countries and/or organizations.

Data Processing—302

FIG. 7 shows the HARS Data Processing Unit 30 that includes HARS hardware, software and data processing services that can be commercial, off-the-shelf products. There can also be a plethora of different processing actions performing different functions of communication and algorithm processing in the Data Processing Unit. Many of these will occur at the main HARS Data Processing Unit 30 but others can occur at other locations. The basic architecture and infrastructure of HARS lends itself to different implementation schemes, which can accomplish multiple functional and operational objectives. For example, while fixed computing recourses can be used in a traditional manner, it also lends itself extremely well to distributed computer and cloud computing. Actual architecture can be determined after it is decided whether to initially implement HARS within a single company's capability or to contract out the implementation. However, since HARS is an open system and is very scalable, there are many actual implementation options. If some initial implementations are on a small, local basis, these may be later integrated into a larger HARS operation becoming the full implementation of the invention described herein.

Data Storage—304

Within the data processing unit 30 is the HARS Data Storage function 304. While fixed storage/memory can be used, cloud storage can also be used. The database used in HARS can actually be a series of databases, all of which can be "intelligent databases". While infrastructure parameters and profiles in HARS is relatively stable, the parameters related to humans is changing and often perishable. As a consequence the database must have the ability to accept changing and perishable information so human profiles can be updated as frequently as possible and in turn, provide updated profiles to subsequence system operations and specifically the Playlist generation.

Since there is a large volume of data from different sources there can be correspondingly a large number of databases. Much of the data can be owned by HARS or on loan to HARS from other agencies. Some of the databases that belong to different government agencies or perhaps foreign governments may not agree to providing entire databases but can agree to certain restricted access to information in their databases. It may be required in some circumstances that information will be stored in separate, secured databases where the contents is encrypted.

The HARS intelligent databases manage information, not just data. They use "artificial intelligence" (AI) in the processes of information management. This level of sophistication is needed to maintain the information as some of it is changing frequently, necessitating updates in the database. In many cases there can be conflicts which will be resolved, thus obviating the need for database manager intervention.

Display Generator—305

It is critical that HARS Playlists be sent to as many display monitors, devices and networks as possible to be most effective. The Display Generator 305 takes the basic HARS graphical presentations of the Playlists and translates it into a form compatible with each different type of display monitor, display device or display network shown in FIG. 7 as blocks 305 and 306.

Figure 8:
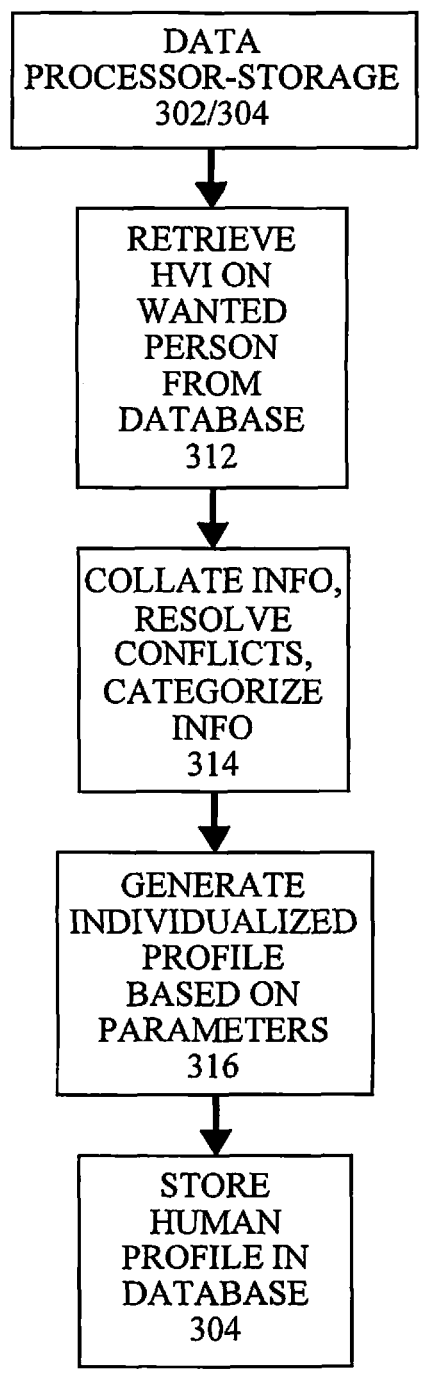
FIG. 8 is a process flow diagram showing the steps for creating a human profile.

FIG. 8 is a flow diagram that shows a complex process to create the human profile 310 on the person of interest or the bad guy. The profile is unique in that it includes a wide variety of human behavioral traits and characteristics and personal values and includes a record of any wrongful acts the person committed that are on file in law enforcement agency databases. The human profile that is created includes many different personal preferences.

As shown, the process starts with retrieval of information stored in the DPU 302 data storage 303. In step 312, high value information HVI on the wanted person is retrieved from a variety of databases, the data is collated in step 314 to resolve any conflicts that may exist before an individualized profile is generated in step 306 based on selected parameters. Once the individualized profile is generated, the human profile is stored in the DPU intelligent database 304.

Create Human Profiles—310

The profile on humans can consist of many information fields that are the same as in other databases, such as the NCIC. Please note that all the fields will not be duplicated and only those that are germane to the HARS profile generation objectives will be used. There can also be other data fields included in HARS which are not typically used in other databases. Some of the data fields can include a person's hobbies, affiliations, location of friends and relatives, past work history, etc. Some of this information can result from the HARS information research efforts, both internal and external.

Profile generation is one of the unique aspects in the strategy of HARS. The objective is to identify all the unique behavioral characteristics and other information which ties the subject to his/her biological, personal, and business relationships, which can help the analysis to determine a list of probabilities where the subject might be located. This provides the means to selectively target discrete areas and monitors to display the wanted profile of the subject. Generation of the profile is one objective and generation of the Playlist, where to display the profile, is another objective, which is addressed in a following section. Please note that this contains information that is used in generating the profiles that can be used for information distribution.

The algorithm used to generate the Profile must contain information on the perishability of the information and a priority to display. Therefore, information on each profile must include a start date, stop date, priority rating, and other information, needed by the Playlist Generator Algorithm, which integrates all the information from the various databases to generate the Playlist for a specific monitor. This database can also contain the search parameters established by the information provider. These might include specific types of display monitors, specific locations, National exposure, a State, County, City, area, location plus a circumference for display, etc.

Retrieve HVI on Wanted Person from Database—Step 312

High Value Information HVI on one person is available from a large number of sources, both commercial and governmental sources, private companies, and social networks. In some cases information can be available from overseas sources. HARS can have an internal research department but may contract with an external agency to acquire additional information. As shown, the collected information is retrieved in step 312 from the data processing unit data processor 302 and databases 304.

Collate Information, Resolve Conflicts, Categorize Information—Step 314

Potentially there can be a large amount of information on an individual. This presents a challenge to collate the information in step 314 and categorize it into the many data fields which can subsequently be used in succeeding data processing operations. Any information which is suspect, whose accuracy or validity is in question can have appropriate data fields marked with the commensurate validity value. Included is behavioral information concerning a person's likes and dislikes, the persons behavior tendencies in different situations, and the like.

Generate Individualized Profile Based on Parameters—Step 316

The individual profile is a description of the person's nature and character. It is the fundamental characterizations that might indicate how a person can behave or act in a given set of circumstances. In this case the person's profile generated in step 316 can provide the information as input to the Predictive Behavior Algorithm.

Currently, human profiling is created for many purposes. Each purpose determines the parameters, which are acquired and used to generate the profile. The information for this profile can be maintained in an "intelligent database", which can automatically be updated as new information is acquired from a variety of sources. HARS generates human profiles, which employ additional, non-typical parameters to create a person's profile. Some of the current parameters include the person's name, alias, all parameters related to encounters with law enforcement and judicial action, relatives, personal acquaintances, hobbies, etc. HARS expands on these parameters and is unique in that it seeks out all information to include behavioral parameters. These include personal likes and dislikes and preferences. Some of these parameters include: sport preferences, food preferences, types of bars the person likes, relationship-types with the opposite sex, medical conditions, favorite drinks, favorite foods, association-types with other people and organizations, etc.

The purpose of this significantly expanded human profile is several-fold. The first is to provide a source of information to generate a series of tailored profiles, where each profile type is specifically targeted to certain types of venues, which are locations where the person might be located or frequent. The second is to provide an input to an algorithm which also uses "information-delivery profiles", to produce a comprehensive predictive list where to provide the tailored profiles for display.

Predictive Behavior Algorithm—317

The human profile is depicted in FIG. 8 and the predictive behavior algorithm is shown in FIG. 7. The objective of the predictive behavior algorithm is to predict locations or venues where there is a higher likelihood the Bad Guy or Person of Interest might be located. This locale, venue, or circumstance then becomes a target for providing HARS information to the public eyes.

Predictive analytics is the process of using historical data to analyze past patterns and predict future patterns. The basis of predictive analytics is to use the relationships between various types of data to estimate the potential or the risk of a given set of conditions. Predictive analytics attempts to explain, analyze, and predict behavior by mathematical or scientific means.

Data Mining techniques have advanced the field by enabling the data to be sorted and categorized in various ways. The greater the level of granularity to which the data can be categorized, the more useful and accurate it will be in predicting future outcomes.

Figure 9:
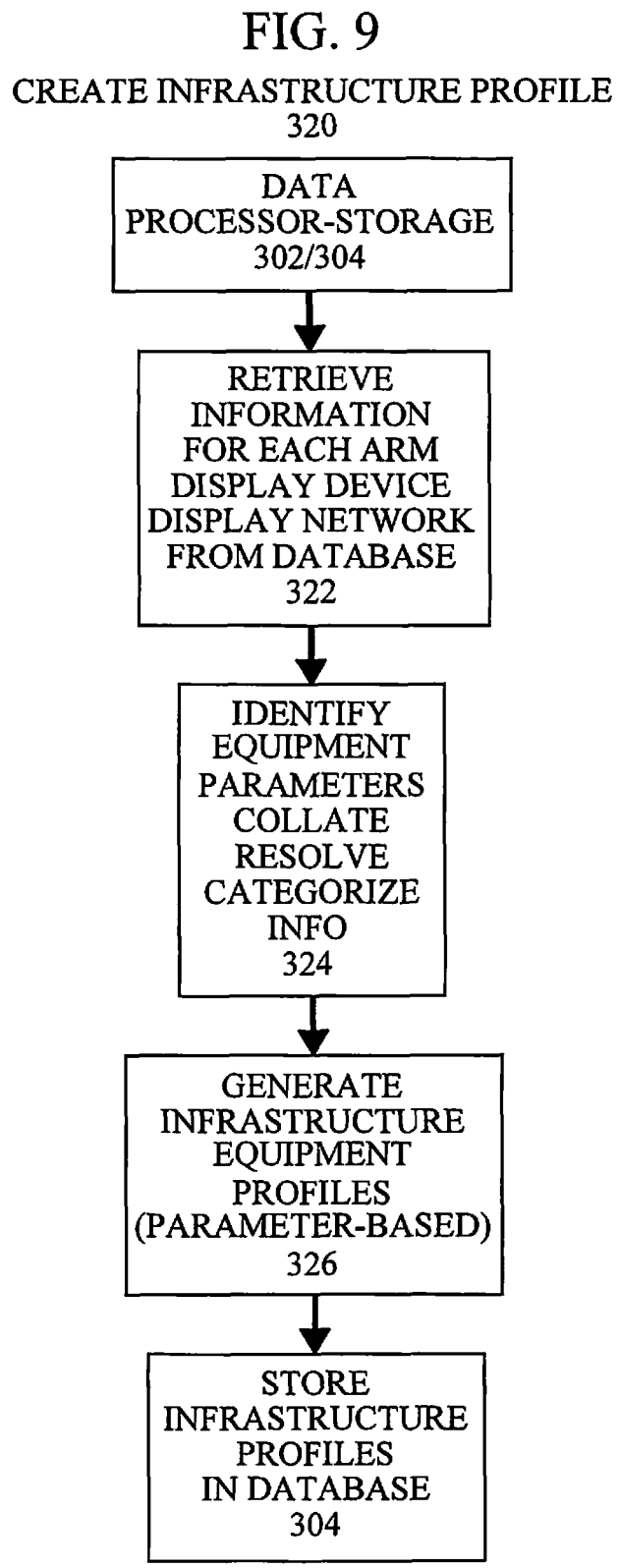
FIG. 9 is a process flow diagram showing the steps for creating an infrastructure profile.

FIG. 9 is a flow diagram for creating an infrastructure profile 320. As shown, information is retrieved from the data base in step 322 for each ARM display device and display network. Each infrastructure profile is created for the information display physical elements in HARS. Every information display and it's parameters are characterized in step 324. The infrastructure profile includes the physical location, direction the monitor or display device faces, a characterization of the neighborhood as well as many of the demographic factors associated with the display devices. In step 326, infrastructure equipment profiled, based on parameters, is generated and the infrastructure profiles are stored in the DPU database storage 304.

Create Infrastructure Profiles—320

Hardware profiles can include, but cannot be limited to, equipment including Alert Response Monitors ARMs, multi-use monitors, computers, routers, etc. Monitors can be located in a wide variety of locations, both indoors and out-of-doors. The ARM display monitor profile data fields can include the specific location, the type of establishment, the nearby environment, the direction the monitor faces, optimum view-time, etc. Thus, if a monitor is located on a highway or an Interstate, it is important to know if the information on the monitor is visible, for example, to the northbound traffic or southbound traffic. Monitors can have different characteristics and capabilities and this information can also be included in the profile. In some cases, a monitor can have an associated hot-line for calling the HARS Call Center (hot lines might be located in International airports where many patrons may not have a functional mobile telephone). Some of the Alert Response Monitors (ARMs) can have an audio output capability to cause various aural alarms and attention-getters to be sounded. In still other cases, the ARM can have an associated video camera with Pan, Tilt, and Zoom capability.

The functionality of each ARM can be identified in the database. In later operations, the HARS Call Center Operator (CCO) can have the ability to access this information and use its capabilities when appropriate. Also contained in the hardware profile will be associated key words to establish a link to related databases. For example, multi-use monitors can be owned by a non-HARS company and can allow the multi-use of their monitor terminals. For these monitors, the database will identify the owner and in a linked database all the pertinent information can be included about the terms and conditions for use (366).

Currently, "information-display monitor" profiling is created for many purposes. Each purpose determines the parameters which are acquired and used to generate the profile. HARS generates "information-display monitor" profiles, which employ additional, non-typical parameters to create these profiles for monitors, which are a candidate for inclusion into the HARS. The information for this profile will be maintained in an "intelligent database", which can automatically be updated as new information is acquired from a variety of sources. Some examples of these include: electronic, digital billboards (indoor and outside); display monitors such as those found in retail stores such as Wal-Mart or Target; some U.S. Post Offices; doctor's offices; ATM machines; fuel pump machines; some fast-food establishments, such as McDonalds; DVD kiosks; as well as many others used in a variety of venues and many diverse locations. For all of these, which can be networked or accessed, they are candidates for inclusion into the HARS.

Some of the examples of the information which can be collected include the following: geographical coordinates of the monitor; type of monitor; hardware-software information on the monitor; owner of the monitor; how the information displayed on the monitor is acquired; whether networked or non-networked managed; ancillary configuration of the monitor, such as audio output, attached video camera, nearby video camera; whether indoor or out-of-doors; size of monitor; size of the city where the monitor is located; physical proximity to immediate surroundings (i.e. how high off the ground); type of store where the monitor is located; type of businesses located near the monitor; type of residences located near the monitor; social and economic characteristics of residents near the monitor; direction the monitor is facing; major roads near the monitor; secondary roads near the monitor; residential streets near the monitor; characterization of the type of person most likely to view the monitor; characterization of the number of people who might view the monitor, by time of day, day of the week; and, many others.

Individual display profiles: Another category of information distribution is HARS information distributed directly to individual members of the public. The public is provided an opportunity to individually register with HARS and create a personal, customized delivery of information to their personal devices to include, but not limited to smart phones, tablets, emails, voice mails, and social media addresses. In this case the individual can establish a personal profile on what information is to be delivered, how it is to be delivered, and when it is to be delivered. The individual can identify their specific geographical area of interest and has an option to allow their smart phones or other capable devices, to input their GPS coordinates. Another option is available to allow the individual to input personal information about themselves.

Billboard Parameters: A means to characterize billboards to maximize comprehension of displayed information. Characterization parameters include, but are not limited to the following:
  a) Description of the immediate surrounding area in terms of business types, residential type, etc.
  b) Direction the billboard is facing
  c) Type of traffic on the roadway
  d) Vehicles per minute, per time of day, which are passing
  e) Identification on presence of traffic lights.
  f) When possible, a tie-in to the sequencing of the stoplights.
  g) Billboard profile generation to include optimum display duration per time-of-day.
  h) Economic descriptor of surrounding area
  i) Identification of linkage to connecting roadways and arteries
  j) Names of housing/subdivision in the surrounding areas
  k) NOTE: Many of these same parameters can also apply to non-billboard display devices/ARMs.

In step 322, Retrieve Information for each ARM, display device, and display network is retrieved. Each and every HARS information Alert Response Monitor AR), display device, and display network can be uniquely identified with detailed data on a wide variety of parameters. The purpose is to provide public information to carefully selected locations under carefully selected conditions.

The information on each ARM, display device and display network can be extensive and can include temporal and geo-demographical information, in addition to the more traditional parameters. A sampling of some of the information captured includes, but is not limited to the following:

Inside—size of monitor/display device, color or black and white monitor, audio capability, normal programming if any, type of establishment it is located in, number x of y monitors in establishment, orientation of monitor in establishment, what percentage of the establishment can view the monitor, type customers in the establishment, are customers seated, standing, or waiting in line, hours of operation, can monitor be seen from outside, typical customer count per time of day, hot line available, and the like;

Outside—Size of monitor or electronic billboard, color or black and white, direction facing, address, street name located on, direction facing, car count per time of day-day of week, type of road located on, nearest major road (identify), nearest highway (identify), etc.

Other information relating the each ARM can include Electronics—model number of unit, serial number of unit, memory capacity; installation and maintenance records; administrative information such as the owner of the monitor, operational agreements and the like; personal information including information on personal devices of those members of the public who have registered their personal information display device (such as smart phones), which can also include GPS coordinates in those cases where the individual has authorized the collection of this information.

Step 324 generates infrastructure equipment profiles identifying equipment parameters, collate Information, resolving conflicts, and categorizing the data. Standardized databases can be created with standardizes parameters. The standardized database files and parameters can be populated from the raw information collected in step 322.

Generate Infrastructure Equipment Profiles are generated in step 326 based on Parameters. A profile can be generated for each Alert Response Monitor (ARM), display device or display network in HARS. These can be used in the subsequent processing and matching with human profiles as part of the generation of individualized Playlists—one for each ARM, display device or display network.

Figure 10:
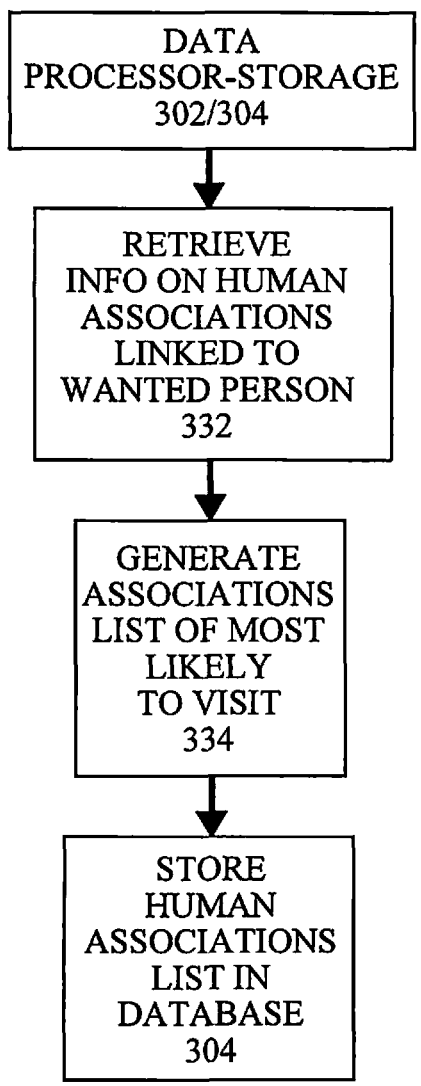
FIG. 10 is a flow diagram showing the steps for creating human associations.

FIG. 10 is a flow diagram showing the steps for creating human associations 330 which creates a detailed list of who knows who and a characterization of the nature of each relationship. This information is entered into the intelligent database where it is used in other HARS processing algorithms.

Create Human Associations—330

It is a human proclivity to contact or remain in communications with people a person already knows. This step in the HARS processing is intended to create a database of people known to the target person. It is also intended to identify the type of relationship, the closeness of the relationship, the currency of the relationship, and identify the last known contacts with that person and the nature of the contact. This can be a process analogous to the Facebook® operation. The human associations information can be a element in the processing for the Predictive Behavior Algorithm used to predict locations of increased likelihood where the target person might be located or might visit.

Retrieve Information on Human Associations Linked to Wanted Person—Step 332

In step 332 information on the Human Associations to the Target person stored at the data processing intelligent database 304 (FIG. 5) is retrieved further processing. Specifically, generate a list of associations a target person is likely to visit, create categories of associations by the nature of the relationship. The generated lists are stored at the data processing intelligent database 304.

Generate Associations List of Most-Likely-to-Visit—Step 334

In step 334 a priority listing of associations by category is generated. Every association can include basic contact information such as address, phone number, type of contact, date of last contact, etc. The list is based on the likelihood that the target person will make a contact with each person in the list.

Create Infrastructure Associations—340

Figure 11:
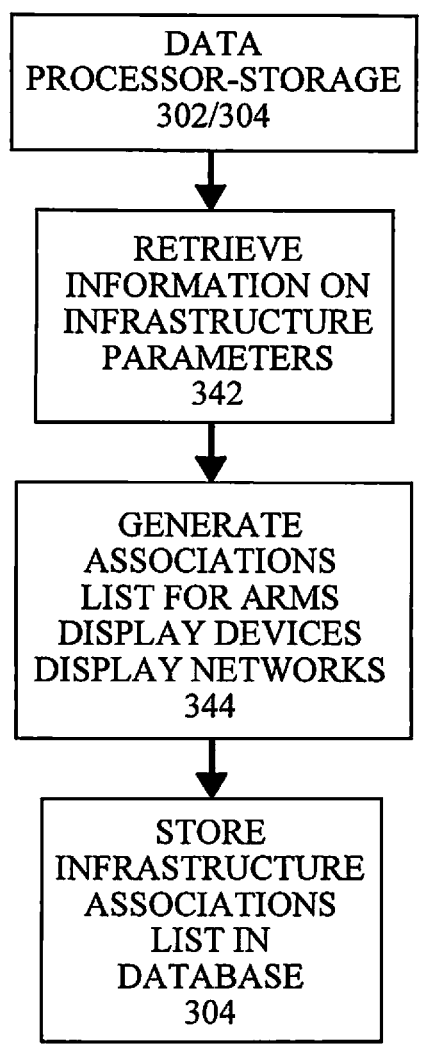
FIG. 11 is a flow diagram showing the steps for creating infrastructure associations.

FIG. 11 is a flow diagram showing the step for creating infrastructure associations 340. As shown, information is retrieved from the data processor 302 data storage 304 in step 342. An associations list is generated in step 344 for ARM display devices 452 and display networks 453 (FIG. 5).

One of the HARS processing steps is the identification of families of display devices. For example, all Sports Bars within a certain radius of a designated location could be designated as one family. A single monitor/display device 452 can be a member of a number of different families depending on the best family to display a specific Profile for a specific person of interest. The results of this processing function are entered into a database 304 in step 346 and are subsequently used in further HARS processing steps when generating the Playlists.

Every Alert Response Monitor 450 and display device 452 is related to every other one in some manner. When information is disseminated to the public the HARS strategy is to disseminate information in a very deliberate manner; to only those monitors and display devices that meet a specified criteria. This criteria might be a location within a certain radius, time of day, type of business district, type of residential neighborhood, type of venue such as sports bar, hair salon, billiards hall, and the like, duration of exposure, or any other factor, or any other combination of factors. The objective is to only disseminate information to the monitors/display devices which have the highest likelihood of being in proximity to a predicted location where the target person might be present.

Retrieve Information on Infrastructure Parameters—Step 342

In step 342, information on infrastructure parameters can be retrieved for further processing to create infrastructure profiles which can be used in creating Playlists.

Generate Associations List for ARMs, Display Devices, Display Networks—Step 344

A fundamental element in the process of creating Playlists is defining the specific infrastructure profiles and associations in step 344 specifically mated to a target person predicted locations, based on the projections of the Predicted Behavior Algorithm. The infrastructure associations list is a dynamic list which changes the information in the intelligent database as changes are received.

Storage of Association List—Step 346

In step 346 the associations list generated in step 342 for ARMs, display devices and networks and the infrastructure associations list generated in step 344 are stored at the data processing unit 30 in the intelligent database 304 shown in FIG. 5.

Playlist Generation—360

FIG. 12, is a flow diagram showing the steps for generating a playlist. This figure shows the basic process of generating the Playlist for each individual display device 452, family of display devices, or various display networks 453. A Playlist is created for every display device/monitor for all of the High Value Information on persons of interest, public service information and advertising information. The priority and perishability of information is also weighed in the process of creating the individualized Playlists. Every Playlist is updated according to the various parameters associated with every profile.

The culmination of the HARS processing steps is to create the Playlist which can display the disseminated information for each individual Alert Response Monitor (ARM) 451, display device 452, or display network 453 shown in FIG. 5. The following are some of the activities related to this process.

Retrieve Human and Infrastructure Profiles—Steps 361 and 362

As shown, information is retrieved from the data processor 302 data storage 304 in steps 361 and 362. The human and infrastructure profiles are two fundamental data sources which are used to generate the HARS integrated Playlist. Because the data for Profiles is being frequently updated, the profiles are also being frequently updated, and as a consequence, this information must be refreshed each time an integrated Playlist is generated.

Retrieve Targeted Advertisement Information—Step 363

Advertising information can be integrated and interlaced with other HARS information that is being disseminated. The advertising information includes many different types of information. It can be owned by the company owning the display monitor/device/network, it can be owned by a third-party, or there can be restrictive agreements regarding what type of information and under what circumstances it can be placed on a particular monitor/display device. An overriding criteria is that advertising information can not detract or interfere with the primary mission, which is to support the "public eyes" and help catch the "Bad Guy". The advertising information is one of the inputs used to create the integrated Playlists in step 365.

Retrieve Public Service Information—Step 364

Public Service Information is retrieved in step 364 and integrated and interlaced with other HARS information in step 365 for dissemination. The public service information 205 can be provided on a routine, non-emergency basis or it can be provided as an emergency requirement. The emergency requirement can be inputted with an internal program override as shown in FIG. 4 for quick dissemination (if a response time of X minutes is acceptable). If a near immediate response time is needed the HARS operator can execute a manual override into the system for expedited dissemination. The advertising information is one of the inputs to create the integrated Playlists.

Retrieve Contractual and Administrative Restrictions—366

Each individual Alert Response Monitor (ARM), family of display monitors, network, or sub-network will have an associated list of contractual and administrative restrictions 366 that restrict what kind of information may be display, and the parameters for when and how the information will be displayed. This is particularly important in the "expanded infrastructure", where the display monitor or network is owned by an entity other than HARS, and HARS has a contractual approval to display information on the non-HARS monitor or network.

In the case where the ARM or display network is owned by HARS, there may still be various restrictions on when and how the information can be displayed, in order to achieve a symbiotic implementation in the environment where it is located. Collectively, the contractual and administrative restrictions are a major element in the Playlist Algorithm, which processes the inputs and created the individualized Playlist for each ARM or network in HARS.

Generate Integrated Playlist—Step 365

The HARS unique Playlist for each Alert and Response Monitor (ARM) or other designated receiver of the Playlist, is created by the Playlist Algorithm in step 365. The algorithm processes all the High Value Information (HVI) and generates a Playlist for each monitor or family of monitors in the geographical areas of highest probably for a "hit" or where the information is needed. When the HVI is for a wanted person, after the Public Eyes recognize the person, the public calls or contacts the HARS Command and Control Center. The Playlist generator step 365 can also create Playlists for data links to external databases where the information can be parsed for secondary distribution to targeted geographical areas.

The Playlist generator creates the Playlist for a variety of media, to include inside/outside monitors, Internet, cell phones, and other handheld and mobile devices. The Playlist can also manage and assign the telephone numbers that the public can call when a "hit" sighting occurs. The telephone numbers can be assigned to specific geographical areas. Each Playlist can have a unique identification code which can be used to reference the specific Playlist. This is one of several means to identify the location or characteristic of the person making the call. Another means is to use the Caller ID or IP addresses, when available. All information related to the location or type of caller can be available to the Call Center Operator (CCO). The Playlist Generator has access to all the information that is desired to be disseminated and displayed, including educational and advertisement information.

The Playlist is a multi-media Playlist and can contain graphic, video and audio information. The Playlist Generator can integrate and interlace information into a coherent, consolidated Playlist, ready for dissemination. The Playlist is provided to another element in the system, the Display Generator. The Display Generator can format the Playlist information and add additional information such as the ID number for the specific profile, the phone number to be called, and other information dependent upon the specific type of display or destination of the Playlist. The Playlist Generator can generate a new Playlist according to the parameters associated with the information contained in the databases, such as frequency of display, when to display, where to display, when to change information, and a host of other parameters.

The Playlist Generator creates the list of Profiles and information which can be displayed on the ARMS or other means of displaying HARS HVI. It can operate according the rules established for the dissemination of HVI for each ARM or other information display device. However, there are emergency and special situations where information dissemination can be stopped by executive action of the Communication Operations Center (COC) by an Over-ride (depicted in FIG. 4). There is also another Over-ride, which can pre-empt normal Playlist operation. This is the high priority, governmental Over-ride. In specially established arrangements certain national, regional or state governments can provide emergency information dissemination through an Over-ride capability to the HARS Playlist, without approval of the HARS Communication Operation Center (COC). It is anticipated that this would be a rare event and only invoked under certain, well-defined emergency circumstances. When it does occur, the COC can be automatically, simultaneously notified.

Figure 13:
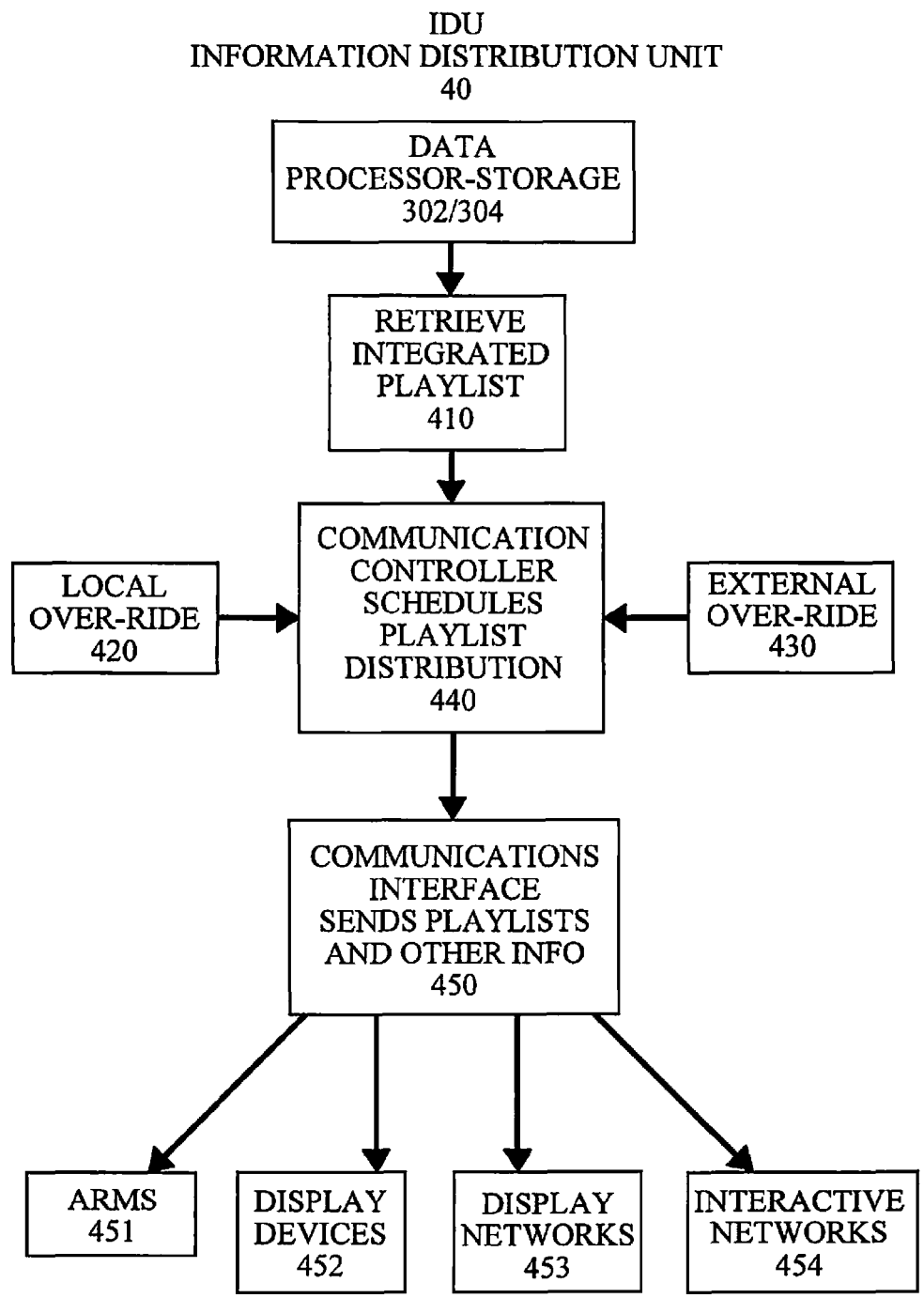
FIG. 13 is a block diagram of the information distribution unit.

The COC can have the capability to cancel the Over-ride as a safety measure, such as in a case of a hacker penetration. The "Local Over-ride—420" and governmental "External Over-ride—430" are shown in FIG. 13.

Store Playlist and Data in Database—304

Another function of the Playlist Generator can be to automatically maintain a log of the Playlist generation and assign an ID to each Playlist. In a subsequent operation, the Communications Controller 440 and Communications Interface 450 can actually send out the Playlists in either of two ways. One is to send the Playlist out to a "smart" display monitor or network which can store the Playlist and play it according to the commands in the Playlist. The other is to send the information in the Playlist to "dumb" information display monitors, family of monitors, or networks.

Information Distribution Unit IDU—40".

FIG. 13 shows the basic process of taking the Playlists and scheduling the playlist and how often they are Played at each display Alert Response Monitor ARM 451, display devices 452, display networks 453, and interactive networks 454. Included in the information distribution are personal notifications, where members of the public have previously registered with HARS and creates a customized, personal profile on how HARS information that would be automatically sent to their smart phone, social media address and/or email address. It also shows that operator overrides to the Playlist is available for special and emergency situations.

Retrieve Integrated Playlist—Step 410

After the information is processed in the Data Processing Unit it goes to the Information Distribution Unit where the Playlists can be retrieved in step 410 and formatted for dissemination. If there are any internal or external priority situations that have occurred either the system of the HARS operators my exercise internal Over-ride commands in step 420 to alter the Playlists, particular in times of emergency. Similarly, external Over-rides are exercised in step 430.

Local Override Step 420

Internal System Overrides are accomplished in step 420. All information collected, from all sources has an extensive field of descriptors, and various parameters defining many attributes. Some of these define the relative importance, priority and perishability of the information. As the Playlists are being developed, information must compete with all other information and vie for a place in the Playlist. This internal negotiation process is a series of computer process negotiations. If an item of information is not selected for a particular Playlist at a particular time, it can later be selected. Even after it has been selected and placed in a Playlist it can only be there for a limited time or certain time windows during the day or certain days in the week. Further, it can be subjected to an override at any time by other information if any of its priority parameters are greater in value.

Operator Override. The HARS Call Center Operator (CCO) has considerable flexibility to modify High Value Information (HVI) dissemination. There are some circumstances when it is necessary to interrupt the normal HARS Playlist execution and display urgent information. The CCO has the capability to create an emergency message for immediate dissemination to a venue or geographical area which the CCO can select. Templates can be used to assist in the rapid generation and dissemination of this message. The interruption can only be authorized for a designated time duration and for a maximum venue and geographical area. The CCO is authorized to do this with an internal "Over-ride" command and every fully-trained and experienced CCO can have this level of authorization.

If an "Over-ride" command is needed for a larger venue, a longer time period, or a greater geographical area, only the "Flash Over-ride" command can be used. There are a restricted number of CCO supervisors, who can be authorized to use this command. The "Over-ride" and the "Flash Over-ride" each require a User ID and password to execute the command. Concurrently with the use of this command, automatic notification can be send to designated HARS Management and Control Center personnel, at both the Manager and Director level.

External Override—Step 430

External overrides are either automatically initiated or manually initiated in step 430. Both of these are highly regulated and are only authorized by governmental directives, which have been pre-established. They can normally only be used in emergency and crisis situations.

Communications Controller: Schedules Playlist Distribution—Step 440

In step 440, the Information Controller accepts Playlist information and assembles it into a consolidated file for distribution. A key element in scheduling the distribution for the Playlists is the contractual and administrative restriction information 366 imbedded in the Playlists.

Communication links to deliver the HARS information is an important element in the system design. There are a wide range of communication links that can accommodate the direct delivery of the information, delivery of information to individual ARMS 451, or a family of ARMS, and to remote servers, which can provide the delivery to a specific community of interest or geographical area. The actual communication links range from dial-up Internet connections to ARMs, dedicated high-speed data links to ARMS, to cellular/mobile telephones with 3G/4G data service (or newer data services), and dedicated high bandwidth links to servers and other computers.

Communications links can be terrestrial, Wi-Fi based, cellular/mobile telephone based, or use satellite connectivity. The Communications Controller has the Playlist identification codes for the information to be delivered in queue and must manage the delivery of the information to its intended, end-destination. In addition, there are priorities associated with specific information which can require delivery of some Playlists ahead of the non-time sensitive information. Also, operator-overrides are able to interrupt the Playlist distribution to expedite delivery of high priority information emergency notifications and urgent public service announcements.

The priorities and communications links can be reconciled by the Communications Controller to optimize efficiency of information delivery. In some case, especially during non-peak traffic loading and dial-up circuits, the delivery of information can normally occur during the night hours.

Another function of the Communications Controller is to manage interactive requests for information and the delivery of that information to the end user. In some cases, profile information and other High value information can be provided in-bulk to a server or another host computer. Data links can include both national links and international links.

Data Links to Authorized Agencies: There can be some major applications that can manage the delivery of HARS information to end users, either passively or interactively through distant servers or other hosts. In this case, there can be a direct connection of the link, or a pass-through of the Communications Controller. In essence, this category of links can be permanent connections to databases and the only purpose of the Communications Controller can be to monitor the connectivity and health-status of the link. In these situations, the distant server or host can provide subsequent categorization and dissemination of the information. Examples of this type of data link might include: communication links to any of the over 70 Fusion Centers, at the local, state and federal level; state and federal agencies, and others including the military U.S. Northern Command. It can also include links to other special agencies and to authorized international destinations.

Communications Interface: Sends Playlists and Other Info to Expanded Network—Step 450

The HARS objective is to get the targeted information in the Playlists to as many viewing opportunities within the targeted geographical areas and targeted venues as quickly as possible. To achieve this objective, a mix of viewing equipment and applications are used. The Communications Interface acts as a "traffic controller" to organize the sending of information on a non-conflict basis. The following identifies some of the viewing opportunities of the High value information (HVI).

Alert Response Monitors (ARMs)—451

Alert and Reporting Monitors (ARMs) are monitors located in places where the public is present. To be most effective there are a wide variety of ARMs specifically designed for different situations. The monitors can be either directly part of the HARS infrastructure or they can be part of the "Expanded Network". The "Expanded Network" can consist of the HARS monitors and monitors owned by other entities, both government and non-government. These monitors can be referred to as "multi-use" monitors because they are jointly used by HARS and the owner of the monitor.

ARMs can be located in a variety of environments and environments which have the largest changing numbers of the public. The objective is to entice and capture the public eyes—to provide motivation and reasons to look at the ARMs. For example, sounds and visual lights can be used to alert the public that a new or high priority high value information HVI is being displayed. Another example is the use of information spots to provide information on rewards that are available, which can draw the eyes to this information and remain while additional HVI is displayed.

Another example is to locate ARMs where the public is "captive", such as waiting at a traffic light, waiting at the gas pump while the fuel is being transferred, waiting for an appointment, and waiting in a line at a store with nothing else to do but wait. This implements the strategy that if the public eyes can be captured, their minds can also be captured and can then be watching as the information in the Playlists is presented. The following briefly describes some of the different environments and different types of ARMs.

ARM environments include, but are not limited to the following examples: Commercial stores such as Wal-Mart (4,227 total units in the United States and 3,210 total international units), Target (966 stores around the world), Best Buy, gas stations, convenience stores, restaurants, hi-way rest stops, along hi-ways, near intersections, and at stadiums and other sports gatherings; and, transportation facilities such as bus stations, airports, and sea port terminals, including cruise ship terminals. Government facilities such as U.S. Post Offices, as well as State and Federal buildings, and military installations.

At military locations, for example, the Army Air Force Exchange System (AAFES) has many locations appropriate for ARMs, such as the food concessions, gas stations, shopettes, barber shops, vendors, and the main store area. As an aside, AAFES currently has wanted posters displayed on bulletin boards. The AAFES operates more than 3,100 facilities at US Army and Air Force bases in all 50 states and in more than 30 countries, and five U.S. territories. ARMs can also be located in foreign locations as can be deemed appropriate by other countries, to include primarily airports and other locations designated by foreign governments.

In transportation terminals the ARMS can be strategically located so that they are visible by the public while watching the arriving or departing passengers (the public can see both at the same time), thus facilitating identification of the persons being displayed on ARM monitor.

Types of ARMS include, but are not limited to the following: Simple monitors with a communications controller that can provide either dial-up connectivity or connection to a local LAN port on the Internet. Monitors can be connected to a local communications controller, which provides connectivity to multiple monitors either through a wire or wireless connection. In both cases, the communications controller can have other capabilities. Some of these include: options for input of local advertising material; storage of the Playlist, which can provide the input for the monitor; control section, which can contain directions for managing and processing information under direction of HARS; auditing program, which can log the IDs for the material and Playlists actually displayed on the monitor, including time, date and frequency; hot-line voice interface for those implementations which can provide the capability of the viewer to call the HARS Call Center Operator (CCO) directly; and, control program for video camera(s) with a Pan/Tilt/Zoom capability, if this option is implemented. Physically diverse monitors in which smaller monitors can be placed for viewing by a clerk at a cash register, for example, or larger monitors which can be viewed by people over a wider area, either indoor, out-of-doors or mounted on vehicles such as buses or trucks.

The following identifies some of the many ARMs options. However, in many cases, these ARMS may be part of a Display Network.

ARM Option: Non-public, Law Enforcement Agency (LEA) information distribution. There will be a standard family of LEA applications, which will only be accessible by enrolled LEAs. LEAs will also have the option to order custom designed applications for information delivery or interactive access.

ARM Option: Non-public, Special Application information distribution. There will be a standard family of specialized applications, which can only be accessible by enrolled government agencies, either national or international. These agencies will be authorized by appropriate authorities. They can also have the option to order custom designed applications for information delivery or interactive access. The data related to each of these specialized agencies can be protected and not available to any other party except by expressed agreement.

ARM Option: Standalone, independent ARM which can select one of various operating modes for information updates, to include but not limited to (1) On-line, continuous updates, (2) HARS dial-up updates, (3) Owner controlled and initiated updates either on-line or dialup.

Internet-Ready Monitors are Also Available.

These monitors are capable of direct connection to the Internet and include applications (Apps and Widgets) specifically designed for access into HARS. They can be easily located in diverse locations.

A "micro HARS terminal" is one step up in technical sophistication from an Internet ready monitor. It can contain one of several programs, depending on the owner's need and can be able to function as an element in the HARS operation while simultaneously providing other services to the owner to meet his/her business needs.

Wireless Monitors are also available which have connectivity provided through any of the wireless company data services. This can allow monitors to be located in many situations, only limited by a person's ingenuity and creativity. One example is an ARM kiosk which can be located in Malls, or temporarily located in locations where special public events are being held, such as a sporting event or concert. These are currently, commercially available and can be ordered with or without a hot-line telephone. They also can be configured with slaved monitors.

Another example of how High Value Information (HVI) is by using existing kiosks, such as the DVD dispensing kiosks. In this embodiment, the video monitor could be operating in a HARS-mode until a customer started a DVD transaction. Thus, the general public walking in the vicinity of the kiosk would have the opportunity to view HARS. Coinstar, the leader in DVD kiosks has over 22,000 terminals and has been installing more at a rate each month. NCR is estimated to operate over 10,000 terminals as a result of its partnership with Blockbuster. NCR added another 1,300 terminals when it acquired DVD Play.

The United States Post Offices (USPS) is another example of possible dissemination of HARS High Value Information. There are over 27,000 post offices in the United States. Many of these have monitors or TVs located in the postal clerk's area, available for the public to watch while they are waiting. Important to note—they are located throughout the United States in cities and major communities. At one time the USPS had clipboards of the FBI's most wanted, but now this is typically not available to the public unless it is specifically requested. Most of the monitors/TVs at the post offices are not actively used (or displaying a soap opera). This presents a natural opportunity to use the existing equipment of the USPS to provide HARS High Value Information.

Conversion of Gas station fuel pump displays to receive HARS. At some gas stations there are currently separate monitors (not integrated with the gas pump) which display information such as "breaking news".

Conversion of Financial ATMs to receive HARS is another option to expand HARS.

Conversion of Ticketing machines with displays can be found at many subway terminals, for example.

Satellite to Ground Receiver device such as a radio or GPS device. It can be integrated or it can be a standalone. The Receiving device receives streaming HARS info into a buffer where it can be stored for playback according to the parameter criteria set by the user. The ground receiver has a video/graphic monitor as an integral part of its design.

Display Devices—452

Personal display devices 452 can include personal computers/smart phones/tablets can be used in several different ways and are a major means to distribute and provide information.

Users can access the HARS website to obtain High Value Information. When a user accesses the site, there can be many options available for the user. The user can request a custom Playlist for the parameters and criteria selected. The information requested can be for local wanted persons, most wanted persons, missing persons, terrorists, and a variety of other options. The user can selectly display information for his/her immediate area, his/her ZIP code or other criteria. The user can also request a listing of registered sex offenders in his area or any other area.

As a side note, while this information is available from a variety of sources on the Internet, it is not consolidated so a user can request a variety of information from a single website—the HARS website. As another side note, there are some areas where sex offender information is assembled in a pamphlet, which is sold in convenience stores.

Members of the public can also register with HARS for distribution of HARS information, automatically, directly to the personal communication and information display devices owned by the public individual. When the public individual registers with HARS, he/she can designate, but is not limited to, what type of HARS information is to be received, when it is to be received, how it is to be presented, and on what devices it is to be received. The public individual can designate their location and optionally can provide HARS approval to retrieve GPS coordinates for dynamic location identification for information distribution. Optionally, the public can register personal information to include, but not limited to, gender, age group, hobbies, activities participated in the public individual, occupation, range of travel from home location. This information can allow another level of tailored information distribution to individuals based on human demographics and not only physical information display devices.

Display Networks—Broadcast & Cable TV—453

In order to attain the maximum effectiveness, the objective is to get the High Value Information (HVI) to as many public eyes as possible, which means that the information should be conveyed through as many media venues as possible. The use of broadcast TV and cable TV is essential. Broadcast TV includes the long-established VHF and UHF television broadcast television stations and satellite television such as Direct TV and Dish TV, and perhaps other satellite direct-to-the-home broadcasts in the future. It should also be noted that in foreign countries there is large satellite viewing population. Another media is Cable TV, which is available through different companies in nearly all parts of the United States. In each case, HARS can generate the High Value Information specific Playlists especially targeted for the viewing area of the medium. In satellite programming, the viewing area is relatively large and Playlists can account for this. In the case of Cable TV, there is a large number of cable-heads which service small specific locales.

The HARS program can accommodate a variety of distribution options, depending on the arrangements with the specific Cable TV company. For example, HARS can provide a data-link to a cable TV server, which in turn can parse the information to its individual cable-heads. Another option is that HARS can generate unique Playlists for each individual cable-head and provide that information directly to each cable-head. There are many options and implementations and the most effective can depend on which arrangement is best suited for a specific Cable TV company. It should be noted that when High Value Information (HVI) is displayed there can typically be telephone numbers displayed to report a sighting. The telephone numbers can be assigned to each viewing area, which means that for each cable-head, the high value information can have a unique telephone number specific to that cable-head and that viewing area. This is one means that can assist in the identifying and confirming the location of the caller.

Display Networks—Cell Phones & Other Handheld/Mobile Devices

There is an extensive proliferation of cellular telephones capable of Internet and data communications, as well as other handheld communications devices. Currently there is a very large and growing number of Smartphones, which have extensive multi-media capabilities well-suited for HARS. All of these provide an extensive opportunity of communications options to deliver HARS High Value Information.

HARS information can be provided directly to cellular and other handheld, wireless devices and it can also be provided to a company, which in turn, provides it to their subscribers. In one option, the HARS information can be provided through another companies service and applications. For example, the New York Times has programs for the PC and MAC to allow access to its on-line newspaper. They also have applications which allow access to news material through several wireless applications. They have one application designed for the BlackBerry, which allows a subscriber to access the New York Times content and another application that is available for the Apple iPhone®. These are examples of how HARS information can be provided through other applications. In these cases, the HARS information could be specifically tailored to the viewership geographical area.

Display Networks—Tablets

One type of device which is rapidly entering the public ownership are devices such as electronic books using the Amazon Kindle®, the Apple iPad®, Sony E-Reader®, Microsoft's Courier tablet/e-book reader, Hewlett-Packard's Slate Tablet®, the Notion Ink Adam, Fusion Garage's Joo-Joo, Archos 7 Home Tablet, Dell Mini 5, Aluratek Libre Pro, and others. With a suitable application all are capable of receiving High Value Information from HARS, both passively and actively. These types of devices extend the proliferation and distribution of HARS information, and in turn, increases the power and effectiveness of HARS.

Miscellaneous Examples

The following are a few examples of how e-readers, cell phones, or other wireless, digital receiving devices can be used with HARS. A cell-phone user can select several levels-of-service. (1) Each time the cell-phone goes off-hook, several HARS images can appear, tailored for the specific area in the vicinity of the cell-phone tower the servicing the cell phone. (2) The cell-phone user can access the HARS information and continue to watch the profiles of wanted persons and other High value information for his/her area until he/she hangs up. (3) The cell-phone user can opt to be called each time a new profile is posted for his cell phone area or when a public service alert is issued. (4) Another option is the cell-phone user can select to receive HARS information for his/her ZIP code or any other ZIP code area.

There are a wide variety of options potentially available to the user. HARS has the information and flexibility to be custom tailored to user desires. The service provider/telephone company can determine what features can be presented to the user and HARS can either provide bulk HARS information for subsequent packaging for distribution to users or can specify requirements for service features and HARS can directly provide the service to the user as a "third-party" service provider to the telephone company. The heart of this capability is HARS, which creates the databases and uses predictive analytics to create the Playlists presenting the information to the public directly, or, through an intermediary which may organize and parse the information for their unique applications.

Display Networks—Mobile Devices

HARS information can be distributed to mobile devices. The following are some possible applications in a mobile environment. (1) An electronic billboard mounted on the exterior of buses and simultaneously on a monitor in the bus. (2) Mobile display monitors mounted in trains. (3) Mobile display information available to the passengers within airplanes, which can be displayed during passenger loading and unloading and on individual passenger terminals while airborne. The basic infrastructure currently exists in many airplanes, particular the overseas flights. The development of specialized handheld and mobile HARS display monitors can be anticipated. For example, a GPS device can be equipped with a wireless data link to receive HARS information, in addition to its normal GPS applications.

Display Networks—"Expanded Network"

The "Expanded Network" is one of the most significant strategies to expand the number of Alert Response Monitors, display devices and display networks in HARS. As the number of the number of display devices expands, the more HARS can become successful and met its mission objectives. The HARS infrastructure can be designed to allow for open connectivity, which can facilitate the ready interface to other computer systems and networks. Through the interconnection and functional co-use of a company's network, such as Wal-Mart's or Target's, mutual synergies and benefits can be realized.

Figure 14:
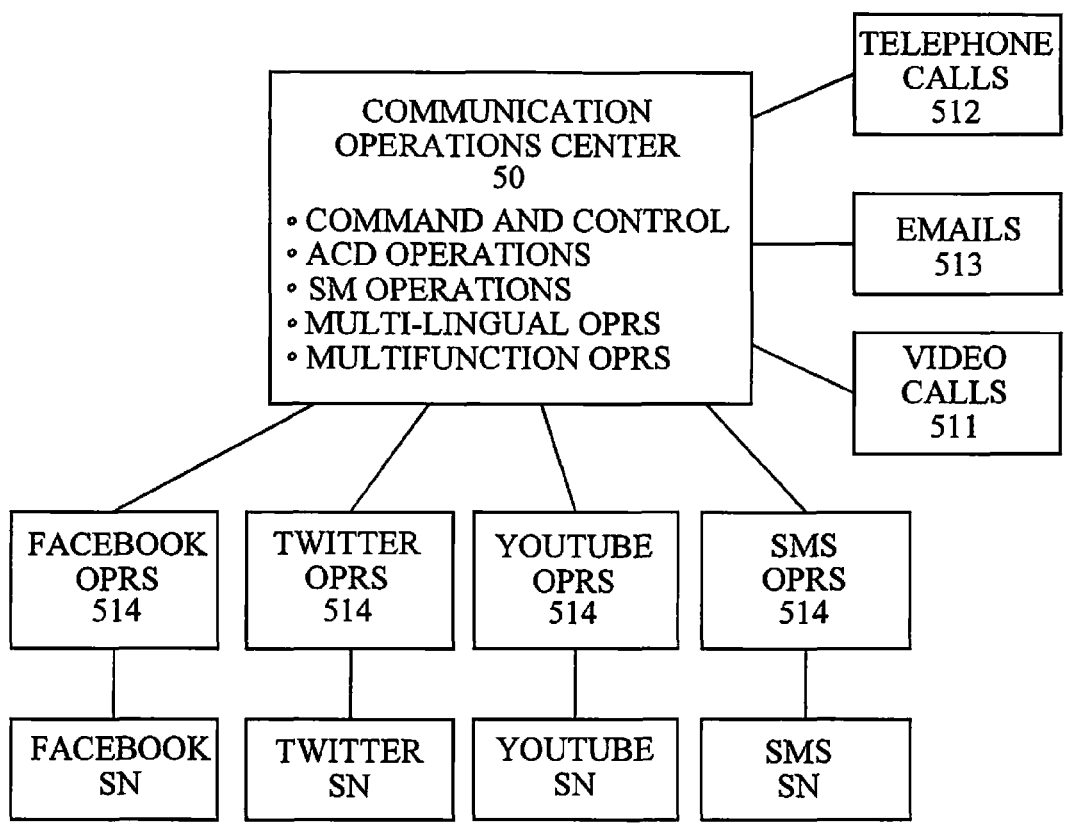
FIG. 14 is a block diagram of the multifunction operations in the call center.

FIG. 14 shows a block diagram of an example of multi-function operators in a call center environment showing a variety of functions which occur in the Communications Operations Center 50. In the social media section, dedicated personnel are focused on each different social media network. Other personnel can respond to telephone (operators with different language capabilities) calls coming in through the Automatic Call Director (ACD), video calls, and SM mobile phone messaging.

Communications Operations Center—50

The Communications Operations Center COC 50 shown in FIG. 14 has several major functions. The COC 50 is manned and is responsible making a variety of decisions, including Command and Control, oversight of the Automatic Call Director (ACD) operations, social media/networking operations, multi-lingual operations, and a variety of other decisions affecting the overall operations of the HARS operation.

Command and Control: determines if an over-ride, such as shown in FIG. 4, is appropriate and authorizes its execution. This the executive department for the operational functioning of HARS. In essence, this is the Office of the "Mission Commander".

The Automatic Call Director (ACD) operations is the managing department for all call center technical concerns and operations. The ACD can have data-line connectivity into a number of HARS functions and can use the information to generate display screens for the call center operators. The ACD operations can also be responsible to maintain proper manning levels.

Social Media (SM) 514 Operations is responsible for the integrated operation of all the SM activities for HARS. It also has two specific responsibilities and can make decisions on how SM information is acted upon. First, if the social media departments identify an actionable situation which is critical and can require immediate action, such as a message or phone call to a LEA, the social media operations can gather all relevant information, assess the situation and confer with the COC 50 command and Control for approval to proceed with the intervention. Second, the social media operations 514 can determine if the information obtained from the SM meets the criteria for submission to the Information Acquisition Unit (IAU).

The Multi-function operators man the ACD Call Center operator positions. These positions are equipped and configured to be multi-functional, capable of conducting traditional ACD functions for incoming voice calls as well as video calls, SMS, and SM interaction.

Over-ride control such as shown in FIG. 4 allows the COC 50 to quickly modify or take control of information dissemination. It also has the capability to replace the delivery of high value information contained in the Playlists with special announcements or other material, which can be prepared material or newly generated material. A very special case of the Over-ride is when pre-establish governmental offices have been giving the capability to use the Over-ride and interject announcements of national or regional importance.

However, the normal case is when there is an emergency and a government agency wants to disseminate emergency information, the Over-ride can be activated by the COC 50 Command and Control personnel based on tactical situations. However, when the over-ride has been directly activated by an authorized government agencies, the COC Command and Control personnel have the capability to deactivate the government over-ride and revert to normal operations. This is a fail-safe measure in the unlikely event that a hacker has successful overcome the security measures and has obtained access to the government over-ride function and command.

Command Calls: These are calls from Government agency Command and Control centers that can be of an urgent nature or a routine nature. In these cases the incoming call be transferred to the Command and Control section in the COC where executive leadership can respond to the call and take action as needed.

Law Enforcement Agencies can call-in to the Communication Operations Center with an urgent need to create a new Bad Guy profile and disseminate the information to a specific geographical region. If the request is urgent, the COC Command and Control section can take action, with the assistance of the information acquisition unit IAU 20. In those cases where the request is routine, the call can be transferred directly to the IAU 20 where all the information can be recorded and placed into proper formatting for inclusion into HARS Intelligent database 304.

There are many NGOs who have high value information databases. These NGOs can call into the COC 50 with an update or addition to their HVI. If the request is urgent (i.e. Amber or Silver Alert), the COC Command and Control section can take action, with the assistance of the information acquisition unit 20. In those cases where the request is routine, the call can be transferred directly to the information acquisition unit 20 where all information can be recorded and placed into proper formatting for inclusion into the HARS Intelligent database 304.

Call Center—51

Figure 15:
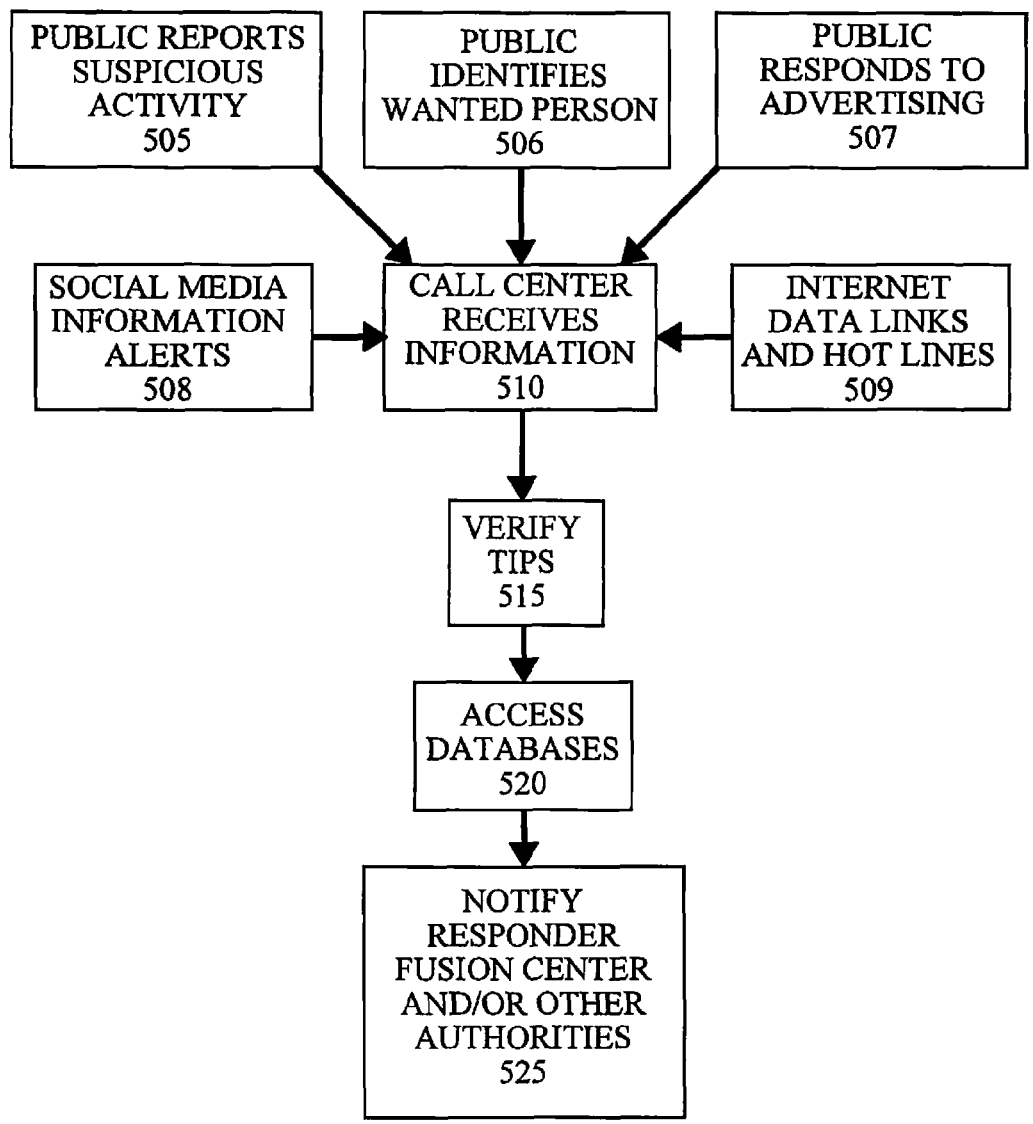
FIG. 15 is a flow diagram showing the call center activities.

FIG. 15 is a process flow diagram showing steps performed in the Call Center 51 portion of HARS showing that Call Center Operators receive information from the public through a variety of communications modes. The operators then evaluate the information and decide what action to take. It can result in the creation of a data item which might be inputted into the database or it might result in a notification to a Law Enforcement Agency, Fusion Centers, other Command Centers, and other government and civilian agencies.

The Call Center 51 is a multi-media Call Center and receives information directly from the public through phone calls, hot-line, video calls, social media/networking calls and alerts such as Twitter®, Facebook®, and data lines connective with other facilities such as Fusion Centers in step 510. The information received can be public reports of suspicious activity 505, public identification of a bad guy 506, a response to an advertisement 507, social media alerts 508, internet data links and hot lines 509, and the like.

The Call Center can also be manned with multi-lingual operators who are selected based on the need. Call Center operators are equipped with terminals which give them access to a variety of information that can be accessed to support them during incoming calls. Operators may generate a Suspicious Activity Reports (SARs) which are formulated in response to information received from the public.

Public Suspicious Activity Reports—505

A suspicious activity report is a report of "something not quite right" which has traditionally been submitted by an law enforcement office. Because the public has not been often encouraged to report "something not quite right", the public reports tend to be ignored or discounted when "something is not quite right". Only relatively recently has then been a few programs to encourage public reporting, such as the "See Something—Say Something" program which is a Homeland Security campaign implemented by the New York Mass Transit Authority to report orphaned bags or anything else unusual. This was a poster campaign.

Currently, there is a lack of integrated efforts to report suspicious activity through the submission of Suspicious Activity Reports. HARS can provide an integrated infrastructure for reporting. It is a "no matter where you are, one phone call to one number can submit a SAR" in step 505. The one number can be programmed into a cellular phone to call in the SAR. Currently, there are many agencies where a SAR can be submitted and correspondingly, many phone numbers. The HARS, ONE NUMBER, can be the same nationwide making the implementation and ability to quickly report by the public tremendously improved. Once a phone-call-submitted SAR is given to HARS in step 505, the specially trained HARS Call Center Operator (CCO) immediately takes the next step by interviewing the caller to ascertain all relevant information and then passing it to ALL appropriate agencies and centers, such as Regional, State, and Local Fusion Centers.

Public Identifies Wanted Person—506

The public calls into HARS are a major source of information. For example; when the "public eyes" identify a Bad Guy as a result of seeing a Bad Guy profile displayed on an Alert Response Monitor, the person can quickly place a call to the HARS Call Center with the "Hit" and HARS can take action. The operator can obtain additional information from the caller and when appropriate, can place a priority call to law enforcement agency responders so they can take action, such as immediate apprehension, while the caller is still communicating with the HARS Call Center.

FIGS. 14 and 15 illustrates information coming from the public to the HARS Call Center through one of the social networks or through video calls, emails, or more traditional telephone calls in steps 505, 506, 507, 508 and 509, which might be hot-lines, landlines, or wireless phone (typically smart phones). The call is received in step 510 at the HARS Operation Center where there can be one operational department responsible for each Social Network. It can be each of their responsibilities to promote and facilitate communications on that specific social network.

Public Responds to Advertising—507

The HARS capability to be interactive with the public creates an opportunity for many interactions with the public from marketing, sales and fulfillment to gaming opportunities. The public might also respond to national surveys which might provide a service to the public.

Call Center Receives Information—510

The HARS Command And Control Call Center 51 is the operational hub and interface with callers reporting a sighting and calls and communications to law enforcement responders and command centers. Central to these activities, can be the command and control console, which provides the operator with a wide range of support capabilities and additional information. Some of the capabilities allow the operator to over-ride designated paths for information distribution and establish priorities for actions, depending on the nature of the call.

Each Alert and Reporting Monitor (ARM) has a unique ID. In some cases, when there are multiple ARMs at a single location, The IDs can be related, indicating they are a member of a family of ARMs located at a specific address. HARS has many telephone caller ID numbers and they are assigned to certain, defined geographical areas. There can also be a single phone number to call HARS, regardless of the callers location. There are different types of calls that a HARs viewer can initiate to the HARS Call Center Operator (CCO). The following addresses some of the main types of calls to the CCO. Another embodiment of the call to the CCO is when there is a dedicated hot-line near the ARM and the caller uses the hot-line.

The HARS is not meant to replace a "911" call in any way—educational spots on the use of "911" can be periodically displayed. A situation where a HARS Hot-Line might be used would be at an International airport where arriving foreign nationals do not have a U.S. cellular phone. The Hot-Line would also be used as overseas transportation terminal for the same reason. While the traditional "911" calls do go to a "911" operator, these operators are more trained for local and typical emergencies and are NOT trained to handle suspicious activities that may be a regional or national threat from a terrorist. HARS provides one number, ease-of-reporting, regardless of the nature of the emergency. In those calls where the emergency is local, the HARS operator can quickly connect the caller to the nearest "911" operator.

When a member of the public watching a HARS information display monitor recognizes a wanted person (criminal or terrorist), a missing person, an Amber Alert, a Silver Alert or a person of special interest, the person can call the displayed telephone number and the HARS Call Center Operator (CCO) can interview the caller. The number dialed can be displayed to the HARS Call Center Operator (CCO), along with the telephone Caller ID, if available. The Call Center Operator (CCO) can first ask the person to provide the ARM ID, which can be displayed on the ARM. Next, the person can be asked to provide the ID for the specific display. The CCO has several options on how to proceed, depending on the capabilities of the specific ARM which the caller is viewing.

At this point, the object is for the CCO to confirm the identification of the wanted person, and that the caller doesn't incorrectly report on one of the other displayed wanted persons. In many cases, the CCO has the capability to take control of the viewers monitor, or family of monitors. The CCO can direct the monitor displays to scroll ahead or to scroll back, under control of the CCO. The purpose is to get the wanted person's image displayed and the display frozen, so the caller can confirm which displayed information the caller is reporting. The operator can access the database for additional profile information on the wanted person and can cause additional images of the person to be displayed so the caller can affirm the identity of the wanted person. One of the duties of the CCO is to establish the creditability of the caller and if it appears that the caller is uncertain of the identity or if the call can be a hoax, this information can be passed on by the CCO.

Another category of calls to the CCO can be to report suspicious activity, which the observer can conclude, "That doesn't seem right", or "That's awfully funny", or "That isn't right". The ARMs can periodically display informative or educational screens, or spots, which can provide public guidance on identifying behavior or situations, which are out-of-the-normal and might indicate terrorist activity. When this occurs, the operator can make the appropriate entry on his/her console display screen and a dialog can be retrieved and displayed on how to conduct the interview with the caller and what questions to ask.

Another type of call is when the caller is responding to a "Be On The Lookout For". The CCO can indicate this on his/her console and a dialogue guide for this type of call can be displayed for the CCO.

Another example is when the caller reports an unsafe or hazardous condition or situation. This might be a tornado sighting or an accident of some type. Normally, these type of calls are made to "911". In these cases, to expedite connectivity, the HARS operator will connect the caller to his/her nearest "911" operator.

The call center operator (CCO) can keep the caller on the line during the Operator's subsequent actions. The CCO can release the caller when it becomes appropriate. After identification the same high value information (HVI) displayed on the ARM can be displayed at the CCO console monitor. In addition, more related information related to the HVI is also available for display, upon selection by the CCO.

The additional information is contained in one or more databases, which the Playlist Algorithm used to generator each Playlist displays to the Call Center operator. One of the databases has the "what to do" and "who to notify" information. In each case, the operator's console monitor can have information displayed providing the next actions to take, who to notify, and the telephone numbers for those who should be called. As soon as the CCO determines the next appropriate action, a phone call can be initiated, in those cases where a phone call is the next appropriate action.

It is also possible that an email notification or follow-up can be indicated. In cases when the CCO calls a law enforcement agency, or other responder, in step 525 the party receiving the call can have been previously briefed and/or trained on the HARS program. The CCO can pass the information to the Responder, who can to speak to the caller directly, if the Responder wants to speak to the caller. The call center operator will then connect the two together and remain on the line. It is the responsibility of the Responder to take action on the situation. It is the responsibility of the CCO to acquire information and facilitate transfer of information. The Responder action might be immediate investigation and possible apprehension, or later investigation.

It is also possible that the Responder can want to have special information put out to the public in the vicinity of the caller. In this case, the operator can use his/her "over-ride" capability to put the playlist on hold and to cause special information to be disseminated, according to prior agreed upon plans and authority. An additional option, which the responder can take is to request the CCO to make additional notifications, if this has not already been specified in the profile database. An example is that because of the unique circumstances the responder can request the CCO to immediately notify the nearest Fusion Center. Regardless, at the conclusion of the "incident", in every case, the CCO can generate a report of the "incident" and action taken. The "incident" can be followed by distributing the "incident report" to a prior agreed upon distribution list. Individual "incidents" can be consolidated into reports generated on a periodic basis and/or upon demand.

To ensure maximum effectiveness in voice communications with the public at the Call Center 51 in both transmit and receive audio, all audio circuits can be equipment with noise-cancelling circuitry and will be recorded.

Verify Tips—515

HARS operators can be training to interact and interview the public caller contacting HARS. Every effort can be made to obtain corroborating information on the "tip" or report provided by the public caller.

Access Database—520

The HARS operator can have the ability to access information in the database 304 to confirm the public caller looking at the correct information. The operator can also be able access other information to correlate it to help confirm the identity of the person the public is calling about.

Notify Responder, Fusion Center or Other Authority—525

There is a tremendous diversity of law enforcement situations; local, national and international, that may occur. Some need prompt attention and others need emergency response, and in other cases the situation may be non-urgent and will be routinely handled. Unfortunately the records are replete of cases where the response to an emergency was inadequate. Every Bad Guy and person of special interest being searched for by HARS has associated with him/her a specific direction on how to respond and what action is required of the call center operator. HARS can have a pre-coordinated response directive, which directs the HARS operator how to respond for each type emergency.

These responses include all governmental agencies and have been well coordinated so that in the event a HARS operator (at the appropriate level of authority) calls a designated number at an agency, the person answering can be fully familiar with HARS and what actions are required.

There can also be a variety of other means on reporting besides telephone, including video channels and computer alert circuits.

In some cases immediate action is required and the HARS operator can be responsive to the "Responder" and assist in any way requested.

Responder—60

Figure 16:
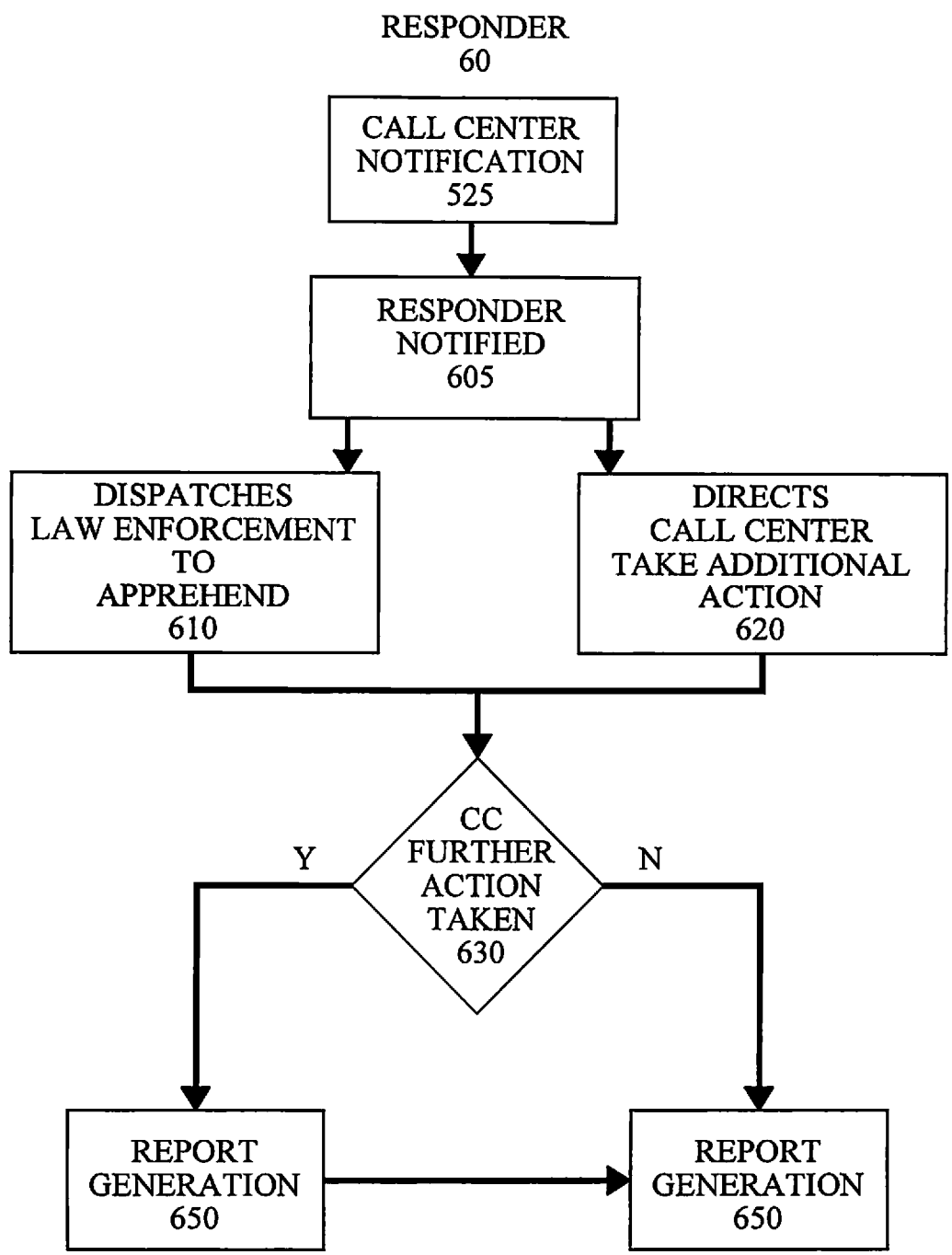
FIG. 16 is a flow diagram showing the steps for the responder.

FIG. 16 is a process flow diagram showing the steps that can be taken by a responder 60 showing the interaction between the HARS call center 51 and law enforcement agencies (LEA) 200, so that when an actionable event happens, the public identifies a person of interest, and HARS notifies the law enforcement agencies 200 responders in step 525 HARS can respond to the directions of the responder 60. Afterwards, any follow-up action can be taken and historical reports can be generated for after-action analysis.

Responder is Notified—605

As shown in FIG. 16, responders 60 can be notified in a number of different ways in step 605. First, the HARS operator can respond per the directions associated with the target person profile. The means of response can be by telephone or some other communications link. Regardless of the method, the HARS Operator can fully assist and cooperate with the Responder and can fully document the notification to the responder and annotate all the details of the event.

Dispatches Law Enforcement to Investigate/Apprehend Wanted Person—610

It is the responsibility of the Responder 60 in step 605 to determine what action needs to be taken to investigate the report and to apprehend in step 610, when necessary. The HARS capabilities can remain available to the Responder as he/she can desire. The Responder notified (person or agency) might not be local to the "hit" and might not be able to physically respond for investigation or apprehension. When this is the case in step 605 the HARS operator remains available to assist and the next action might be to notify the local Law Enforcement Agency to investigate and/or apprehend. Pre-coordination with the Law Enforcement Agency can already have been performed so the response can be quickly pursued without wasted time due to confusion and fuzzy lines of authority.

The CCO can prepare a report on the HARS actions and provide it to the Responders point-of-contact, as previously specified. HARS can request an after-action report in step 620 from the Responder to close out the "incident". From the report and subsequent analysis, the many facets of HARS can be considered in light of the "incident" to determine how HARS actions and system can be improved to increase its effectiveness.

620 Directs Call Center to Take Additional Action—620

The HARS Call Center 51 can have many resources not available to the Responder. In step 605 the Responder 60 can direct the Call Center to take additional action as shown in FIG. 16. Additional communications or notifications can be made on behalf of the Responder 60 or additional research can be conducted into the extensive information in the HARS intelligent database 304 through queries to fulfill the Responders requests.

Call Center can or Cannot Take Further Action—630

If further action has been requested, in step 630 the Call Center 51 can determine what additional resources are needed and quickly make arrangements to get the resources.

Call Center Takes Additional Action—640

The Call Center 51 can take the remaining action required. If for any reason additional time is required, arrangements can be secured in step 640 to insure all requested assistance has been rendered or appropriate arrangements completed.

Report Generation—650

After the event has concluded, the responsible HARS Call Center operator can be responsible to generate a report in step 650 to document events, identify persons involved, included any phone numbers and all other relevant information. The outcome and disposition of the event can be clearly documented in the report. All Report information can be placed into on-line reports and the report distribution completed per previous determinations and coordination.

While the invention has been described, disclosed, illustrated and shown in various terms of certain embodiments or modifications which it has presumed in practice, the scope of the invention is not intended to be, nor should it be deemed to be, limited thereby and such other modifications or embodiments as can be suggested by the teachings herein are particularly reserved especially as they fall within the breadth and scope of the claims here appended.

I claim:

1. A high value information alert and reporting system for predicting locations of specific wanted persons and persons of interest to the public through selected display monitors, comprising:

an interactive computer system including a processor based data unit and a memory storage for storing a software executable program in a centralized operations with a single centralized database two or more different communication mediums for acquiring information on specific wanted persons and persons-of-interest, crimes and public service information;

a plurality of monitors, display devices and networks with display monitors forming display groups that are shared for disseminating information to the public on the specific wanted persons and the persons of interest, each display group selected from one of at least a geographical location, a venue, a display type and a display audience;

a predictive association algorithm to compile association information to generate a dynamic group association of individuals with a relationship to the wanted persons and the persons of interest;

a profiling algorithm executable on the computer system for profiling the wanted persons and the persons of interest based on the acquired information and the association information to predict locations and whereabouts of the profiled wanted persons and the profiled persons of interest;

a set of target instructions for generating behavioral profiles of the profiled wanted persons and the profiled persons of interest;

a set of distribution instructions for distributing the targeted information to the public by at least one of the display groups;

an input interface to allow the public to report location and whereabout information on details of the profiled wanted persons and the profiled persons of interest; and an investigator for investigating predicted physical locations of the profiled wanted persons and the profiled persons of interest by law enforcement in order to aid law enforcement investigation and apprehension of the profiled persons.

2. The system of claim 1, further comprising:

a High value information Alert and Reporting system (HARS) headquarters and operational center, the interactive computer system operating from the High value information Alert and Reporting system (HARS) headquarters and operational center.

3. The system of claim 2, wherein the high value information alert and reporting system and operational center further comprising:
a multi-modal, multi-media infrastructure for acquiring and disseminating high value information on a target person or person of interest to one or more different foreign and domestic civilian and governmental agencies.

4. The system of claim 2, further comprising:
a process to acquire, provide and share information on the profiled wanted persons and the profiled persons of interest between international civilian and governmental international organizations.

5. The system of claim 2, further comprising:
an override process to allow approved governmental agencies to directly disseminate emergency information for public welfare, and the acquired and the profiled information on the specific wanted persons and the persons of interest directly to the public using the high value information alert and reporting system.

6. The system of claim 1, the interactive computer system further comprising:
a target information delivery system for distributing the target information to the public, in public places, so the public helps locate the wanted persons.

7. The system of claim 6, wherein the target information delivery system comprises:
a display database in the single centralized database, of available public announcement devices for displaying the target information to the public within range of the public announcement device; and
a distribution algorithm for dynamically determining type of information distributed to each public announcement device to provide the wanted information to the public information devices in locations where there is an increased likelihood the profiled wanted persons and the profiled persons of interest are located, and where public information is needed.

8. The system of claim 7, wherein the display database includes:
a plurality of individually owned information display devices and services to receive the target information from the target information delivery system.

9. The system of claim 1, further comprising:
a playlist algorithm to create a playlist of the profiled wanted persons and the profiled persons of interest, and additional information, which are matched to each monitor, display device, and display network, where the profiled wanted persons and the profiled persons of interest are be located, and where public service information is needed.

10. The system of claim 1, further comprising:
an expanded network infrastructure interfaced with the High value information Alert and Reporting system (HARS) headquarters and operational center, the expanded network infrastructure including one or more of domestic and international law enforcement agencies, social media networks, public suspicious activity reporting systems, public and private research databases and commercially owned communications networks.

11. The system of claim 1, further comprising:
a call center for the public to report sightings of the specific wanted persons and the persons of interest by the public through a multi-media call center to report sightings to the call center.

12. The system of claim 11, further comprising:
a social network communication link for the public to report sightings and association data of wanted persons to the call center.

13. The system of claim 11, wherein the social network communication link includes one or more of traditional and cellular telephone phone calls, video phone calls, social networking messaging, text messaging, short messaging, emails, hot lines, and data lines.

14. The system of claim 11 further comprising:
a predictive behavior algorithm to determine one or more likely locations where the profiled wanted persons and the profiled persons of interest are located based on the information provided by the public.

15. The system of claim 1, wherein the predictive association algorithm determines which friends, relatives, and acquaintances in the group association the specific wanted persons or the persons of interest are most likely to contact.

16. The system of claim 1, further comprising:
a predictive behavioral analytic algorithm for collecting behavioral data specific to the target person or person of interest and predicting one or more locations the specific wanted persons or the persons of interest are likely to visit based on the collected behavior data.

17. The system of claim 16, wherein the predictive behavioral analytic algorithm collects and uses information corresponding the the specific wanted persons or the persons of interest likes and dislikes and past reactions to different circumstances for predicting the one or more locations the specific wanted persons or the persons of interest are likely to visit.

18. The system of claim 1, further comprising:
a law enforcement agency secure communication link for exchanging information on the specific wanted persons or the persons of interest with other Law Enforcement Agency (LEA) databases for mutual support of law enforcement objectives.

19. The system of claim 1, further comprising:
a suspicious activity report generated in response to a reported public observation.

* * * * *